(12) United States Patent
Brandao et al.

(10) Patent No.: US 10,347,142 B2
(45) Date of Patent: Jul. 9, 2019

(54) AIR TRAFFIC SYSTEM USING PROCEDURAL TRAJECTORY PREDICTION

(71) Applicant: Honeywell International Inc., Morris Plains, NJ (US)

(72) Inventors: Ruy C. Brandao, Redmond, WA (US); Guo Qing Wang, Beijing (CN); Yong Zhang, Beijing (CN); Jing Zheng, Beijing (CN); Yingang Yu, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 120 days.

(21) Appl. No.: 15/524,176

(22) PCT Filed: Nov. 5, 2014

(86) PCT No.: PCT/CN2014/090316
§ 371 (c)(1),
(2) Date: May 3, 2017

(87) PCT Pub. No.: WO2016/070349
PCT Pub. Date: May 12, 2016

(65) Prior Publication Data
US 2017/0337829 A1  Nov. 23, 2017

(51) Int. Cl.
*G08G 5/04* (2006.01)
*G08G 5/00* (2006.01)
*B64D 45/00* (2006.01)

(52) U.S. Cl.
CPC ........... *G08G 5/04* (2013.01); *B64D 45/00* (2013.01); *G08G 5/0008* (2013.01); *G08G 5/0021* (2013.01); *G08G 5/045* (2013.01)

(58) Field of Classification Search
None
See application file for complete search history.

(56) References Cited

U.S. PATENT DOCUMENTS 5,566,074 A   10/1996   Hammer
5,892,462 A   4/1999    Tran
(Continued)

FOREIGN PATENT DOCUMENTS

CN   1161097      10/1997
CN   101996501    3/2011
(Continued)

OTHER PUBLICATIONS

Communication pursuant to Rules 70(2) and 70a(2) dated Jul. 20, 2018, from counterpart European Application No. 14905605.3, 1 pp.

(Continued)

*Primary Examiner* — Brent Swarthout
(74) *Attorney, Agent, or Firm* — Shumaker & Sieffert, P.A.

(57) ABSTRACT

In one example, a method for generating air traffic alerts includes determining a predicted trajectory for a target air-craft, based at least in part on a comparison of information received on a recent trajectory of the target aircraft with a set of procedural trajectory information. The method further includes determining whether a violation of protected airspace is predicted between the target aircraft and an ownship, based at least in part on the predicted trajectory for the target aircraft and a predicted trajectory for the ownship. The method further includes generating an alert output in response to determining that the violation of protected airspace is predicted.

20 Claims, 7 Drawing Sheets

(56) References Cited

U.S. PATENT DOCUMENTS

| | | |
|---|---|---|
| 6,420,993 B1 | 7/2002 | Varon |
| 6,820,006 B2 | 11/2004 | Patera |
| 6,873,903 B2 | 3/2005 | Baiada et al. |
| 6,950,037 B1 | 9/2005 | Clavier et al. |
| 7,711,484 B2 | 5/2010 | Hammarlund et al. |
| 7,835,866 B2 | 11/2010 | Tzidon |
| 8,442,707 B2 | 5/2013 | Ledesma et al. |
| 8,744,738 B2 | 6/2014 | Bushnell |
| 9,533,617 B2 | 1/2017 | Van Steenkist et al. |
| 2003/0107499 A1 | 6/2003 | Lepere et al. |
| 2009/0018713 A1* | 1/2009 | Coulmeau ............ G08G 5/0013 701/3 |
| 2010/0292871 A1* | 11/2010 | Schultz ................. G01C 21/00 701/3 |
| 2011/0282582 A1* | 11/2011 | Stayton ................ G08G 5/0008 701/301 |
| 2012/0158219 A1 | 6/2012 | Durling et al. |
| 2012/0303252 A1 | 11/2012 | Schwinn et al. |
| 2013/0317733 A1 | 11/2013 | del Pozo de Poza et al. |
| 2013/0338909 A1 | 12/2013 | de Blanes et al. |
| 2013/0338910 A1 | 12/2013 | Vilaplana et al. |
| 2014/0052314 A1 | 2/2014 | Ostrom et al. |
| 2014/0085124 A1 | 3/2014 | Dusik et al. |
| 2014/0172301 A1* | 6/2014 | Navarro ................. G01W 1/00 702/3 |
| 2015/0294573 A1 | 10/2015 | Conner et al. |
| 2017/0110018 A1 | 4/2017 | Wang et al. |

FOREIGN PATENT DOCUMENTS

| | | |
|---|---|---|
| CN | 104020681 | 9/2014 |
| EP | 1517281 A2 | 3/2005 |
| EP | 1764759 A1 | 3/2007 |
| EP | 2325825 A2 | 5/2011 |
| EP | 2469291 A1 | 6/2012 |
| JP | 4640806 B2 | 3/2011 |
| WO | 2007123438 A1 | 11/2007 |
| WO | 2016070349 A1 | 5/2016 |

OTHER PUBLICATIONS

Extended Search Report from counterpart European Application No. 14905605.3, dated Jul. 3, 2018, 7 pp.

International Search Report and Written Opinion of International Application No. PCT/CN204/090316, dated Jul. 29, 2015, 6 pp.

"Chapter 3: Airspace," Aeronautical Information Manual, U.S. Department of Transportation, FAA, May 26, 2016, 67 pp.

"Chapter 7: Airport Traffic Patterns," Airplane Flying Handbook, U.S. Department of Transportation, FAA, FAA-H-8083-3A, 2004, 13 pp. (Applicant points out, in accordance with MPEP 609.04(a), that the year of publication, 2004, is sufficiently earlier than the Application's earliest priority date, Nov. 5, 2014, so that the particular month of publication is not in issue).

"Chapter 9: Basic Flight Maneuvers," Rotorcraft Flying Handbook, U.S. Department of Transportation, FAA, FAA-H-8083-21, 2000, 31 pp. (Applicant points out, in accordance with MPEP 609.04(a), that the year of publication, 2000, is sufficiently earlier than the Application's earliest priority date, Nov. 5, 2014, so that the particular month of publication is not in issue.).

"Improved Ground Collision Avoidance System for General Aviation Aircraft and UAVs," Tech Briefs Media Group, Jan. 1, 2016, 2 pp.

Baek et al., "ADS-B Trajectory Prediction and Conflict Detection for Air Traffic Management," Technical Paper, International Journal of Aeronautical & Space Sciences, Sep. 2012, 2012, vol. 13, No. 3, pp. 377-385.

Carpenter et al., "Probability-based collision alerting logic for closely-spaced parallel approach," AIAA Meeting Papers on Disc, American Institute of Aeronautics and Astronautics, Inc., Jan. 1997, 9 pp.

Hwang et al., "Intent-Based Probabilistic Conftict Detection for the Next Generation Air Transportation System," Proceedings of the IEEE, vol. 96, No. 12, Dec. 2008, 23 pp.

Kochenderfer et al., "Next-Generation Airborne Collision Avoidance System," Lincoln Laboratory Journal, vol. 19, No. 1, Jan. 2012, 17 pp.

Maeder et al., "Trajectory Prediction for Light Aircraft," Journal of Guidance, Control, and Dynamics, vol. 34, No. 4, Jul.-Aug. 2011, 8 pp.

Xu, "TCAS/ADS-B Integrated Surveillance and Collision Avoidance System," Proceedings of the 2nd International Conference on Computer Science and Electronics Engineering, Mar. 22-23, 2013, pp. 666-669.

U.S. Appl. No. 15/219,235, by Honeywell International Inc. (Inventors: Guoqing Wang et al.), filed Jul. 25, 2016.

Response to the Communication pursuant to Rules 70(2) and 70a(2) EPC dated Jul. 20, 2018, from counterpart European Patent Application No. 14905605.3, filed Dec. 31, 2018, 14 pp.

* cited by examiner

AIR TRAFFIC SYSTEM USING PROCEDURAL TRAJECTORY PREDICTION

This application is a national stage entry under 35 U.S.C. § 371 of International Application No. PCT/CN2014/090316, filed Nov. 5, 2014, entitled, "AIR TRAFFIC SYSTEM USING PROCEDURAL TRAJECTORY PREDICTION." The entire content of International Application No. PCT/CN2014/090316 is incorporated herein by reference for all purposes.

This disclosure relates to air traffic systems.

BACKGROUND

Air traffic control systems track positions and velocity of aircraft and help prevent aircraft collisions within the vicinity of airports. Air traffic control has traditionally been based on radar surveillance, supplemented more recently with cooperative radio surveillance techniques, such as automatic dependent surveillance-broadcast (ADS-B). An aircraft may determine its own position, such as via a Global Navigation Satellite System (GNSS), and periodically broadcast its position via a radio frequency, which may be read by ground stations and other aircraft. Aircraft position data may be provided to a variety of other applications that serve functions such as traffic situational awareness, traffic alert, procedural separation, and collision avoidance, for example.

SUMMARY

This disclosure is directed to systems, devices, and methods for generating air traffic alerts. A system of this disclosure may compare trajectory information from another aircraft with information on procedural aircraft trajectories that may be followed in air traffic patterns that may be specific to particular airports or airspaces. Comparing the trajectories of other aircraft with procedural aircraft trajectories may enable more accurate predictions of aircraft trajectories, and more accurate air traffic alerts to assist a pilot in avoiding trajectories that bring the pilot's ownship into potentially undesirable proximity with the other aircraft.

In one example, a method for generating air traffic alerts includes determining a predicted trajectory for a target aircraft, based at least in part on a comparison of information received on a recent trajectory of the target aircraft with a set of procedural trajectory information. The method further includes determining whether a violation of protected airspace is predicted between the target aircraft and an ownship, based at least in part on the predicted trajectory for the target aircraft and a predicted trajectory for the ownship. The method further includes generating an alert output in response to determining that the violation of protected airspace is predicted.

In another example, a system for generating air traffic alerts includes a trajectory propagation unit configured to determine a predicted trajectory for a target aircraft, based at least in part on a comparison of information received on a recent trajectory of the target aircraft with a set of procedural trajectory information. The system further includes a conflict search engine configured to determine whether a violation of protected airspace is predicted between the target aircraft and an ownship, based at least in part on the predicted trajectory for the target aircraft and a predicted trajectory for the ownship. The system further includes an output node configured to generate an alert output in response to determining that the violation of protected airspace is predicted.

Another example is directed to a device comprising a computer-readable medium having executable instructions stored thereon for generating air traffic alerts, configured to be executable by one or more processors for causing the one or more processors to determine a predicted trajectory for a target aircraft, based at least in part on a comparison of information received on a recent trajectory of the target aircraft with a set of procedural trajectory information. The executable instructions are further configured for causing the one or more processors to determine whether a violation of protected airspace is predicted between the target aircraft and an ownship, based at least in part on the predicted trajectory for the target aircraft and a predicted trajectory for the ownship. The executable instructions are further configured for causing the one or more processors to generate an alert output in response to determining that the violation of protected airspace is predicted.

The disclosure is also directed to an article of manufacture comprising a computer-readable storage medium. The computer-readable storage medium comprises computer-readable instructions that are executable by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory or storage element that stores instructions (e.g., in the form of a computer program or other executable) to cause a processor to perform the techniques described herein. The computer-readable medium may be a non-transitory storage medium.

The details of one or more examples are set forth in the accompanying drawings and the description below. Other features, objects, and advantages will be apparent from the description and drawings, and from the claims.

DETAILED DESCRIPTION

Various examples are described below generally directed to devices, systems, and methods for air traffic procedural trajectory prediction, and air traffic alerts for potential protected airspace violations based on the procedural trajectory prediction. The air traffic procedural trajectory prediction by a system of this disclosure may include predicting aircraft trajectories based on any of a wide variety of air traffic protocols or other sources of air traffic information, as further described below.

Figure 1:
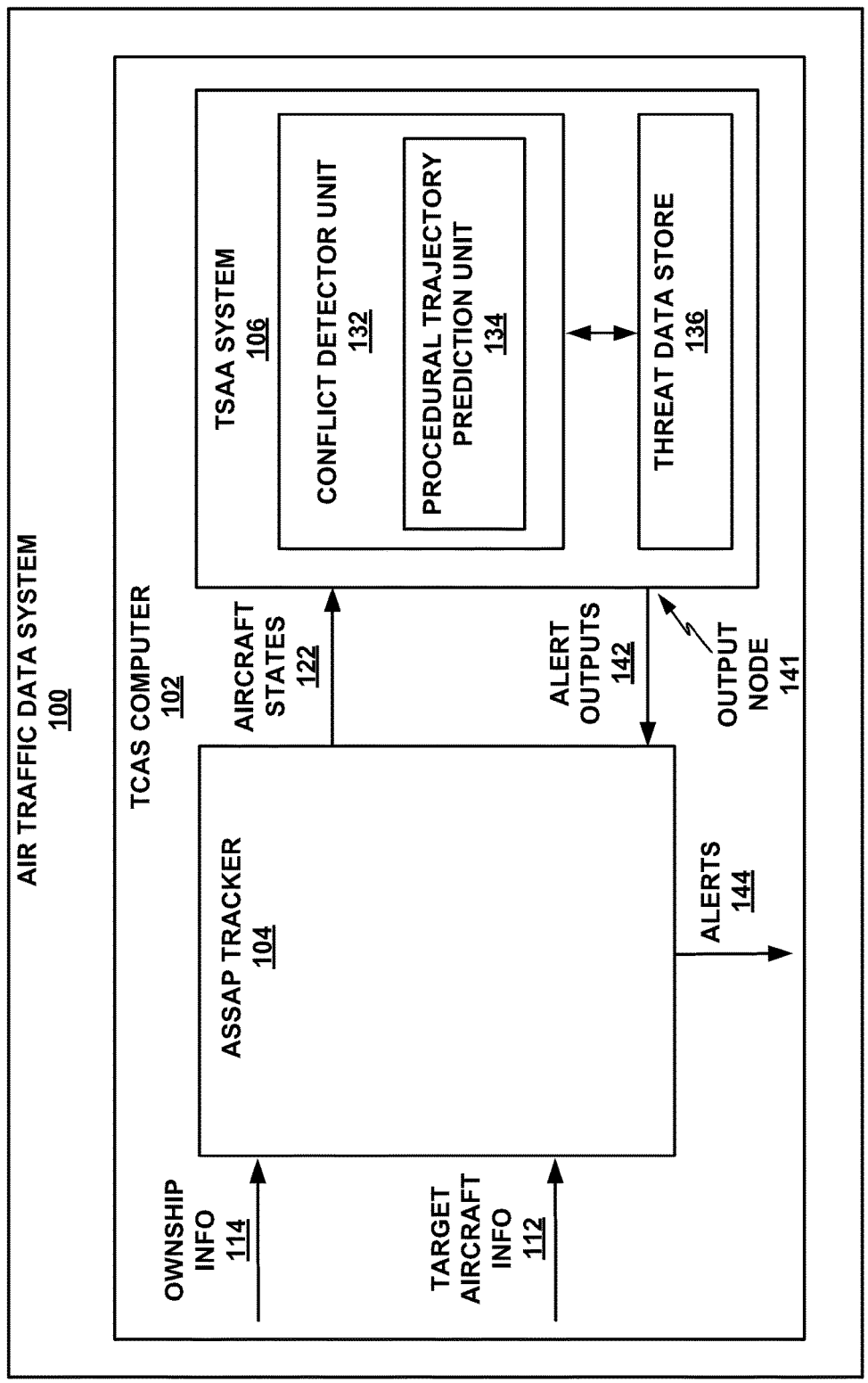
FIG. 1 depicts a conceptual diagram of an example air traffic data system that includes a Traffic Collision Avoidance System (TCAS) computer.

FIG. 1 shows a conceptual block diagram of an example air traffic data system 100 that includes a Traffic Collision Avoidance System (TCAS) computer 102. Air traffic data system and TCAS computer 102 may be incorporated as part of the avionics on an aircraft, or may be implemented in a ground station, in various examples. TCAS computer 102 includes an Airborne Surveillance and Separation Assurance Processing (ASSAP) tracker 104 and Traffic Situation Awareness and Alert (TSAA) system 106. TSAA system 106 includes a conflict detector unit 132 including procedural trajectory prediction unit 134. As shown in FIG. 1, ASSAP tracker 104 interfaces with and uses TSAA system 106. TSAA system 106 may in some examples be implemented at least in part as a software package or software library comprising computer-executable instructions stored on and/ or executed by TCAS computer 102, as well as data stored and/or processed at least in part by TCAS computer 102. TSAA system 106 may also be implemented in hardware or firmware in some examples. ASSAP tracker 104 interfaces with and uses TSAA system 106 are further explained below. Air traffic data system 100 and TCAS computer 102 may also include various other systems and components beyond those shown in FIG. 1 and described below.

A flight crew of an aircraft, which may include air traffic data system 100 in some examples, may fly the aircraft in accordance with established guidelines, which may be defined by an entity and followed by aircraft flying within certain regions. For example, the Radio Technical Commission for Aeronautics (RTCA) is an entity that defines Minimum Operational Performance Standards (MOPS or MPS) for General Aviation (GA) aircraft in the United States, including standard DO-317B, which corresponds in Europe to the ED-194 standard defined by European Organisation for Civil Aviation Equipment (Eurocae)). The DO-317B standard includes functionality specifications for Aircraft Surveillance Applications (ASA). In some examples, ASSAP tracker 104 using TSAA system 106 of FIG. 1 may fulfill the ASA functionality specifications of the DO-317B standard, and may also provide additional performance advantages that go beyond the Minimum Performance Standards defined by DO-317B. In other examples, ASSAP tracker 104 may fulfill other functionality specifications of other standards, such as the ED-194 standard or other standards for other regions.

ASSAP tracker 104 may determine, based at least in part on incoming target aircraft information 112, an estimated target aircraft state for each of one or more target aircraft within a selected range or vicinity, where the target aircraft state may include position, altitude, and velocity (both speed and vector of velocity). In some examples, ASSAP tracker 104 may determine and maintain a determined trajectory or track for each of the one or more target aircraft for as long as they remain active targets for tracking, e.g., they remain airborne and within a selected range or within a selected range of an airport proximate the aircraft (the "ownship") that includes air traffic data system 100 or with which system 100 is associated if system 100 is not located onboard an aircraft. ASSAP tracker 104 may also maintain extrapolated, predicted future trajectories or tracks for the ownship and all applicable target aircraft out to a selected common point in time in the future, and update those predicted tracks at a selected frequency, e.g., one hertz.

As noted above for air traffic data system 100 and TCAS computer 102, ASSAP tracker 104 and TSAA system 106 may be implemented on an aircraft or at a ground station. ASSAP tracker 104 may receive target aircraft information 112 from one or more surrounding aircraft, which may be referred to as target aircraft, as inputs via an automatic dependent surveillance-broadcast (ADS-B)In Receiver and/ or other surveillance data sources. Target aircraft information 112 may include air-to-air ADS-B reports, automatic dependent surveillance-rebroadcast (ADS-R), traffic information service—broadcast (TIS-B), active TCAS surveillance, and/or other sources of information on other aircraft. ASSAP tracker 104 may also receive ownship information 114 (information on the subject aircraft that hosts air traffic data system 100, if ASSAP tracker 104 is implemented on an aircraft as opposed to a ground station), as inputs. The example of FIG. 1 is further discussed in context of an ASSAP tracker 104 and TSAA system 106 implemented on a subject aircraft that incorporates air traffic data system 100 (the ownship) and evaluating information for the ownship as well as one or more target aircraft. ASSAP tracker 104 may process those inputs, and output aircraft states 122, including target aircraft states and ownship aircraft states, specifying position, trajectory, and altitude information for the one or more target aircraft and the ownship,to TSAA system 106. An example of a flight context for such a trajectory prediction and threat detection is discussed further below with reference to FIG. 2.

TSAA system 106 receives aircraft states 122 from ASSAP tracker 104 as inputs. TSAA system 106 includes a conflict detector unit 132 and a threat data store 136. Conflict detector unit 132 includes procedural trajectory prediction unit 134. Conflict detector unit 132 may interact with threat data store 136 and use procedural trajectory prediction unit 134, and potentially additional units or modules, to perform calculations based at least in part on aircraft states 122 and determine whether there is an imminent risk of two aircraft entering each other's protected airspace (or coming too close to each other, as further described below). The protected airspace may be defined relative to the respective aircraft and may define a volume of space around the aircraft. The protected airspace may also be referred to as a protected airspace zone. When conflict detector component 132 makes a determination of an imminent risk of a protected airspace violation, TSAA system 106 may generate, via output node 141, one or more alert outputs 142 of TSAA system 106 to ASSAP tracker 104. The alert outputs 142 generated by TSAA system 106 may indicate target aircraft alert states and alert levels for one or more specific target aircraft, in some examples.

ASSAP tracker 104 may then generate and output one or more alerts 144, e.g., to a pilot or flight crew of the ownship, based on the alert outputs 142 that ASSAP tracker 104 receives from TSAA system 106. ASSAP tracker 104 may output alerts 144 to audio and/or video output interfaces of air traffic data system 100, such as a display and a loudspeaker of the aircraft (e.g., a display in Class II systems and a loudspeaker in Class I or II systems), and/or other systems, components, or devices to which air traffic data system 100 may be operably connected. The alerts 144 generated by ASSAP tracker 104 may also include indications of target aircraft alert states and alert levels for one or more specific target aircraft, based on information in the alert outputs 142 from TSAA system 106, in some examples. Additional details of TSAA system 106 are further described below.

The protected airspace of a general aviation aircraft in flight proximate to an airport may be within 500 feet (about 152 meters) horizontal and 200 feet (about 61 meters) vertical of the aircraft, in some examples. ASSAP tracker 104 may recompute target aircraft and ownship states and output the recomputed or updated aircraft states 122 to TSAA system 106 at a rate of at or approximately one hertz or once per second, in some examples. ASSAP tracker 104 using TSAA system 106 may be specified to generate an alert when there is a risk of a protected airspace violation (or intrusion) within 20 to 35 seconds of the predicted airspace violation, for example, such that generating an initial alert less than 20 seconds prior to the predicted airspace violation would be considered as a late alert or missed alert, in some examples.

TSAA system 106 may both track protected airspaces around one or more target aircraft and the ownship, and perform trajectory predictions for the one or more target aircraft and the ownship. TSAA system 106 may implement alerting decision logic based on both the protected airspaces and the predicted trajectories of each of one or more target aircraft and the ownship. TSAA system 106 may use the position, altitude, and velocity (both speed and vector of velocity) of each of one or more target aircraft and the ownship as inputs in making its determinations of whether to trigger an alert and potentially what information to include in an alert. In addition, TSAA system 106 may use information, which may be associated with specific airports, to predict the behavior of aircraft around the airport. The information may vary between airports.

Figure 2:
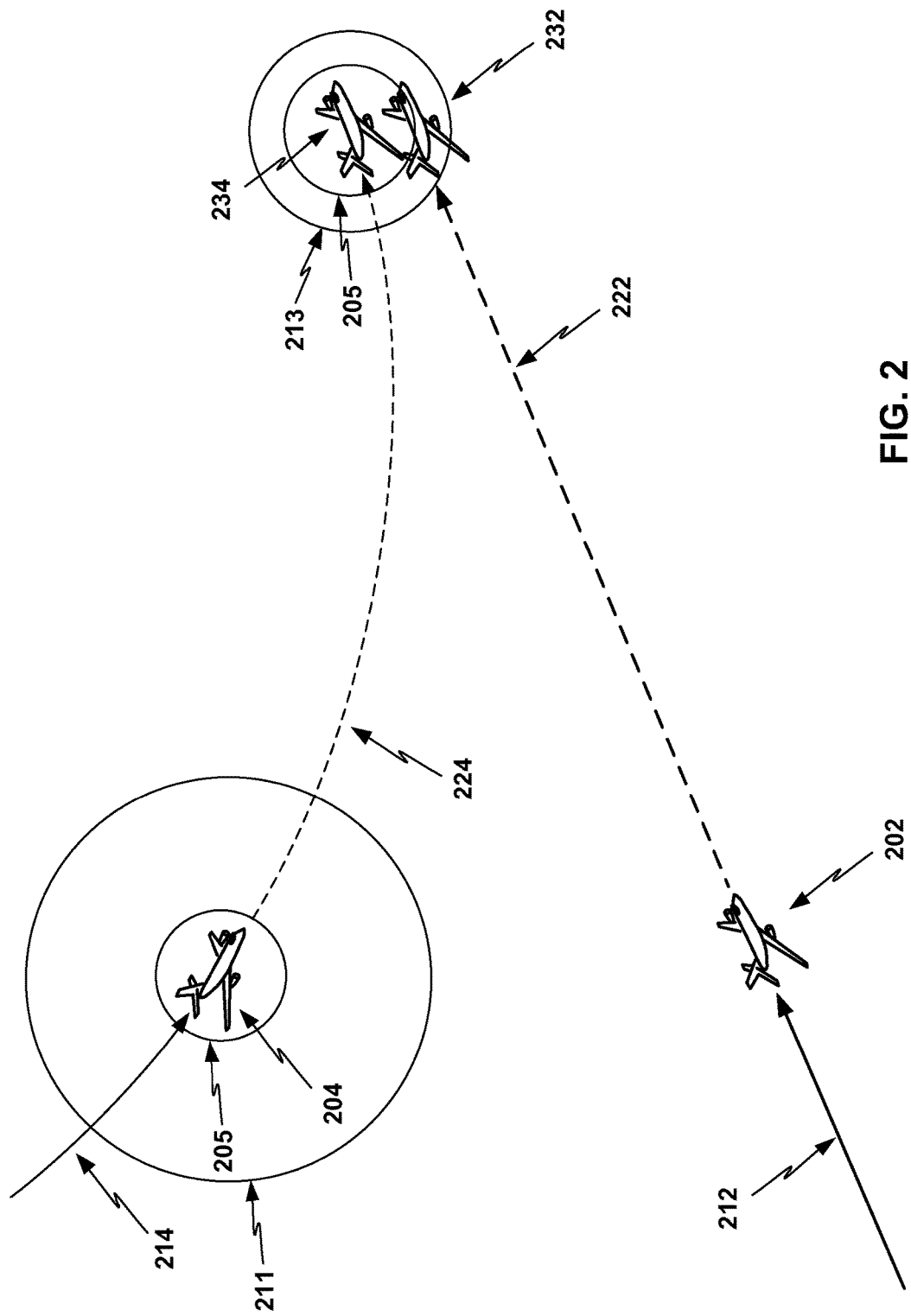
FIG. 2 shows a conceptual diagram of two aircraft potentially on course for an undesirable protected airspace violation.

FIG. 2 shows a conceptual diagram of two aircraft potentially on course for a protected airspace violation. FIG. 2 shows an illustrative example of a flight context in which air traffic data system 100 of FIG. 1 may predict trajectories of an ownship and a target aircraft, and generate a protected airspace violation alert. FIG. 2 shows an ownship 202 and a target aircraft 204 in flight in the vicinity of an airport, e.g., within four miles of the airport (airport not depicted in FIG. 2). Ownship 202 is on a straight trajectory, and target aircraft 204 is turning with a constant turn rate trajectory. Ownship 202 has air traffic data system 100 on board, in this example. Air traffic data system 100 on ownship 202 receives information on the trajectory of ownship 202 from other systems aboard ownship 202. Air traffic data system 100 on ownship 202 also receives ADS-B reports from target aircraft 204 containing information on the trajectory of target aircraft 204. Air traffic data system 100 may also receive information on one or more target aircraft via other means besides ADS-B reports transmitted directly from those one or more target aircraft, in some examples. Air traffic data system 100 may receive information containing data describing the past trajectory 212 and current heading of ownship 202, and information containing data describing the past trajectory 214 and current heading of target aircraft 204.

Air traffic data system 100 may, in some examples, extrapolate from the information it has to predict that ownship 202 will remain on a predicted trajectory 222 heading in a straight line at the same speed, direction, and altitude continuous with its past trajectory 212. Air traffic data system 100 may, in some examples, also extrapolate from the information it has to predict that target aircraft 204 will remain on a predicted trajectory 224 continuing to turn at the same constant turn angle, speed, and altitude as in its past trajectory 214. Air traffic data system 100 may determine based on predicted future trajectories 222 and 224 that these predicted trajectories will bring ownship 202 and target aircraft 204 into proximate positions 232 and 234 within less than a selected future interval, e.g., within less than 35 seconds of the present (e.g., within 35 seconds of its latest approximately one hertz prediction determination, in some examples). Air traffic data system 100 may then generate an airspace violation alert for the pilot (and potentially crew) of ownship 202, in this example.

In particular, TSAA system 106 may determine a protected airspace zone (PAZ) 211 around target aircraft 204, and a collision airspace zone (CAZ) 205 around target aircraft 204, and predict if or when ownship 202 is projected to intersect PAZ 211 or CAZ 205 of target aircraft 204. CAZ 205 may be defined to be constant, with a constant x-y radius around target aircraft 204 and a constant z height above and below target aircraft 204. For example, CAZ 205 for target aircraft 204 may be defined with an x-y radius of 500 feet and a +/−z height of 200 feet. The dimensions of the CAZ may be correlated with the size of target aircraft 204. PAZ 211 may be variable, depending on factors of prediction uncertainty, with an x-y radius around target aircraft 204 and a z height above and below target aircraft 204 that are greater than the corresponding dimensions for CAZ 205 and that may be varied with respect to the closure rate between target aircraft 204 and ownship 202. For example, for target aircraft 204 in predicted position 232, the dimensions of the PAZ may be reduced to PAZ 213 as shown in FIG. 2. For purposes of this disclosure, determining whether a violation of protected airspace is predicted between the target aircraft and an ownship may include determining whether a violation of either protected airspace zone (PAZ) or a violation of collision airspace zone (CAZ) is predicted between the target aircraft and an ownship.

TSAA system 106 may determine trajectories of one or more aircraft (including ownship in some examples) using a variety of methods, including projections of constant straight trajectory or constant turn rate (or constant track angle) as discussed above with reference to FIG. 2, and constantly varying turn rates (or constantly varying track angles), such as in accordance with a Minimum Operational Performance Standards (MOPS) TSAA algorithm as described in the RTCA DO-317 reference. Additionally, TSAA system 106 of this disclosure may also determine trajectories of one or more aircraft using more complex and often more realistic procedural or protocol-based trajectory predictions. Procedural or protocol-based trajectory predictions performed by TSAA system 106 may make use of any of a variety of procedural or protocol-based trajectory information sources. These procedural or protocol-based trajectory predictions may be performed by procedural trajectory prediction unit 134 (FIG. 1) as a specialized algorithm or resource or collection of specialized algorithms or resources implemented as part of conflict detector unit 132, as further described below with reference to FIG. 3.

Figure 3:
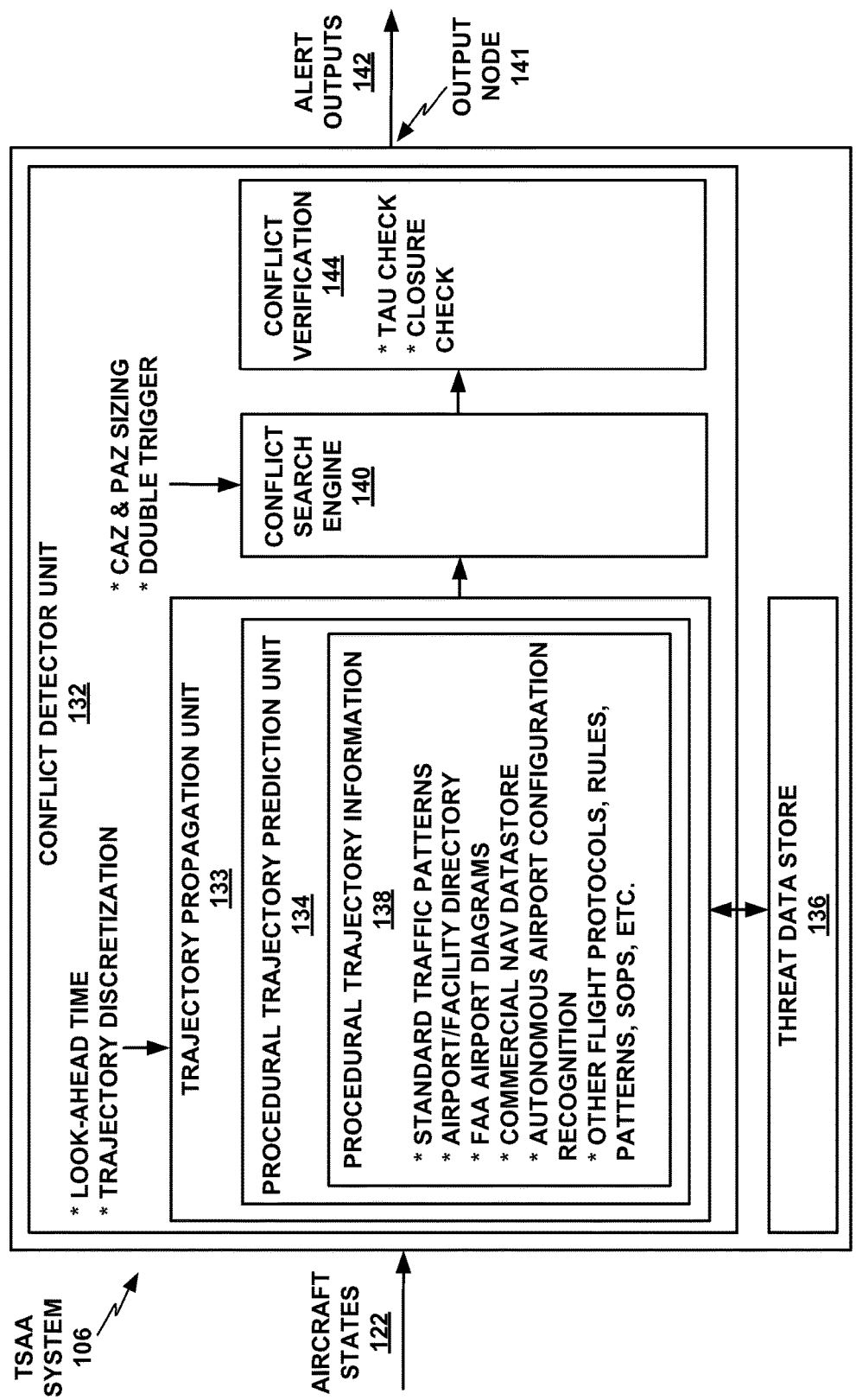
FIG. 3 depicts an example functional block diagram of TSAA system with additional detail in accordance with illustrative examples in which a conflict detector unit includes a procedural trajectory prediction unit, as shown in FIG. 1.

FIG. 3 depicts an example functional block diagram of an example TSAA system 106 with additional detail in accordance with illustrative examples in which conflict detector unit 132 includes procedural trajectory prediction unit 134, as shown in FIG. 1. Conflict detector unit 132 includes procedural trajectory prediction unit 134 as part of a trajectory propagation unit 133, in this example. Conflict detector unit 132 also includes a threat data store 136, a conflict search engine 140, and a conflict verification unit 144, as shown in FIG. 3. Conflict detector unit 132 is configured to receive aircraft states 122 as inputs, determine whether there are any predictions of protected airspace violations (as further described below), and generate alert outputs 142 based on those determinations, as described above with reference to FIG. 1.

Constant trajectory, constant turn rate, and varying turn rate methods as discussed above may be performed by trajectory propagation unit 133, which may extrapolate current straight trajectories, current constant turn rates, and current varying turn rates of a subject aircraft, respectively to predict the trajectory of the aircraft. Procedural trajectory prediction performed by procedural trajectory prediction unit 134 of TSAA system 106 of this disclosure may implement methods, algorithms, or techniques to predict an aircraft trajectory based at least in part on any of a wide variety of procedural or flight protocol information sources incorporated in procedural trajectory information 138, as further discussed below.

Trajectory propagation unit 133 may receive the aircraft state input 122, store and access respective information for each of one or more proximate target aircraft as potential threats in threat data store 136, and repeatedly compare predicted target aircraft trajectories with predicted ownship trajectories, utilizing procedural trajectory prediction unit 134 with reference to procedural trajectory information 138. As shown in FIG. 3, trajectory propagation unit 133 may apply selected look-ahead time, or the forward time interval to extend the applicable aircraft trajectory predictions (e.g., about 20 seconds to about 60 seconds, such as about 35 seconds in some examples). As shown in FIG. 3, trajectory propagation unit 133 may also apply trajectory discretization, e.g., decomposing predicted trajectories of aircraft into discrete states of predicted position, heading, and altitude of the respective aircraft at discrete times along future predicted trajectories. Trajectory propagation unit 133 may use these features to determine or predict one or more future trajectories for each applicable aircraft, including the ownship and one or more target aircraft.

As shown in FIG. 3, trajectory propagation unit 133 may output its results to conflict search engine 140. Conflict search engine 140 may compare the predicted trajectories for the ownship and the one or more target aircraft to determine whether any of the one or more target aircraft at any given time in its predicted trajectory would intercept the protected airspace of the ownship at the same given time in its predicted trajectory. In some examples, conflict search engine 140 may determine and apply the Collision Airspace Zone (CAZ) and Protected Airspace Zone (PAZ) around a target aircraft, including sizing the CAZ and PAZ as discussed above, and double trigger techniques(e.g., two consecutive predicted violations of CAZ or PAZ, to reduce nuisance alerts from a lone erroneous predicted violation, unless the predicted violation is below a double trigger threshold requiring an immediate alert) in implementing its determination of a predicted airspace violation, as further discussed reference to TSAA algorithm examples below. Conflict search engine 140 may generate outputs indicating predicted airspace violations and information relevant to those predicted airspace violations to conflict verification unit 144.

Conflict verification unit 144 may run tests or checks to verify or assure the accuracy of the predicted airspace violations determined by conflict search engine 140. For example, conflict verification unit 144 may perform a tau check and a closure check (tau being time to predicted closest approach of target aircraft and ownship), as further discussed below with reference to TSAA algorithm examples. In some examples, conflict verification unit 144 may either override a potential protected airspace violation alert that it finds inconsistent or that fails to pass the conflict verification checks, or conflict verification unit 144 may confirm the potential alert and enable conflict detector unit 132 to generate an alert output 142 via output node 141.

Procedural trajectory information 138, in algorithmic and/or data store implementation, may incorporate any of the following examples of procedural or flight protocol information sources (as partially shown in FIG. 3): standard traffic pattern operations as may be encoded or described in any of various references; the Airport/Facility Directory (A/FD) as published by the U.S. Department of Transportation or another entity; U.S. Federal Aviation Administration (FAA) Airport Diagrams or airport diagrams from another entity; commercial navigation databases and/or data stores, which may include airport configuration information and airport runway configuration information, and/or one or more subsets of or interfaces with such commercial navigation databases and/or data stores; an autonomous airport configuration recognition system implemented by onboard systems; and/or other protocols, rules, air traffic patterns, airport-applicable standard operating procedures (SOPs), standard piloting practices, flight operation reference information, or other patterns or conventions of general aviation piloting, for example, all of which may be collectively referred to as "procedural trajectory information" for purposes of this disclosure (e.g., procedural trajectory information 138 of FIG. 3). Procedural trajectory prediction unit 134 may also apply, e.g., algorithmic means of simplifying criteria and/or logic applicable to procedural trajectory prediction based on data or information from any procedural trajectory information sources, including those listed above. Similarly, trajectory prediction (e.g., by procedural trajectory prediction unit 134) based on procedural trajectory information (e.g., procedural trajectory information 138) as opposed to simple constant straight trajectory, constant turn rate, or constantly varying track angle (e.g., which may be computed or implemented by other elements of trajectory propagation unit 133), may be collectively referred to as "procedural trajectory prediction" for purposes of this disclosure.

Procedural trajectory prediction unit 134 may incorporate procedural trajectory information 138 directly in algorithms of its executable instructions, in some examples. Procedural trajectory prediction unit 134 may also incorporate or interface with procedural trajectory information 138 in the form of a procedural trajectory information data store that may store either all or some (e.g., an auxiliary set)of the procedural trajectory information, in some examples. In some examples in which a procedural trajectory information data store is used, it may be implemented as an in-memory data cache to avoid buffering latency for real-time operating performance, e.g., to implement assured execution times in a selected fraction of a second, to support one-hertz update rates for aircraft trajectories and airspace violation determinations. Procedural trajectory prediction unit 134 may incorporate procedural trajectory information 138 as either or both of direct algorithmic incorporation of procedural trajectory information and/or accessing a procedural trajectory information data store, in various examples. In some examples, incorporating the procedural trajectory information 138 directly in algorithms of its executable instructions may allow faster processing speed for procedural trajectory prediction unit 134, while in some examples, implementing the procedural trajectory information 138 in a data store (e.g., an in-memory data cache system such as Redis, Memcached, etc.) may enable more flexibility and ease of adding to or modifying the procedural trajectory information. In various examples, procedural trajectory prediction unit 134 may comply with the RTCA DO-178B standard, Software Considerations in Airborne Systems and Equipment Certification.

TSAA system 106 of this disclosure performing procedural trajectory prediction using procedural trajectory information may predict a wide variety of future changes in the trajectory or trajectories of one or more aircraft based on realistic assessments of future changes in trajectories based on the procedural trajectory information. The procedural trajectory information may enable TSAA system 106 to propagate (or predict) a flight path of a target aircraft more accurately compared to examples in which the flight path of a target aircraft is predicted without consideration of the procedural behavior of aircraft. TSAA system 106 of this disclosure performing procedural trajectory prediction using procedural trajectory information may achieve a substantially higher accuracy in generating protected airspace violation alerts, relative to traditional air traffic alert systems. The improved accuracy of alerts of TSAA system 106 of this disclosure may include both a higher percentage of alerts generated when proper, as well as a reduced percentage of false positives, or nuisance alerts, that may be frequently generated by some traditional air traffic alert systems.

For example, when a traditional air traffic alert system predicts constant turn rate or constantly varying turn rates over significant time periods, they may predict a trajectory "wrap-around effect" of subject aircraft turning in repeating circles or spirals (as described below with reference to FIG. 3), which may not correspond to true flight paths. In contrast, TSAA system 106 of this disclosure performing procedural trajectory prediction may avoid such unrealistic wrap-around effects (full 360 degree turns), e.g., by predicting the trajectory of the target aircraft based on known procedures, rather than merely extending the current trajectory of the target aircraft in the same constant turn rate. Thus, TSAA system 106 may help achieve substantially lower percentages of both missed alerts and false positive nuisance alerts relative to traditional TSAA algorithms. For example, traditional air traffic alert systems can typically perform with a late alert rate of around 2.5-3.5%, a no alert rate (where no alert is given at all of a protected airspace violation) of around 0.2-0.3% (both late alerts and no alerts may be considered grouped together as "missed alerts"), and a false positive/nuisance alert rate (in which an alert is generated despite no actual danger of protected airspace violation) of approximately 40-60%. Such a high false positive/nuisance alert rate may cause unnecessary distraction for a pilot and may risk fatiguing a pilot's sense of urgency for valid alerts. In contrast, TSAA system 106 of this disclosure may reduce both missed alerts and false positive nuisance alerts, and may thereby provide a safer and more useful air traffic alert system.

Figure 4:
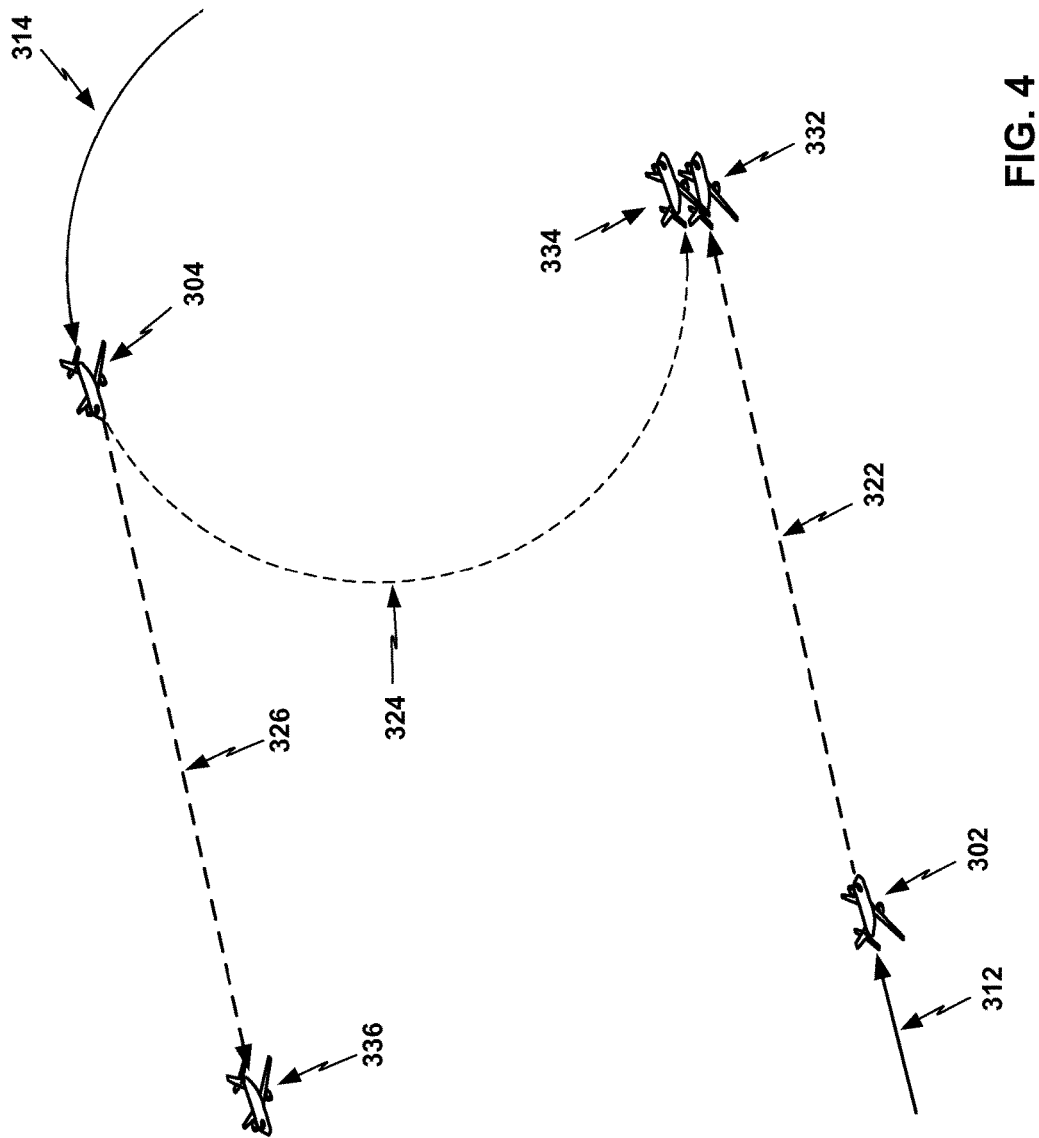
FIG. 4 shows a conceptual diagram of two aircraft in flight, an ownship and a target aircraft, along with various possible predicted flight trajectories, in another illustrative example of a flight context in which an air traffic data system may predict trajectories of an ownship and a target aircraft, and generate a protected airspace violation alert.

FIG. 4 shows a conceptual diagram of two aircraft in flight, an ownship 302 and a target aircraft 304, along with various possible predicted flight trajectories, in another illustrative example of a flight context in which air traffic data system 100 of FIG. 1 may predict trajectories of an ownship and a target aircraft, and generate a protected airspace violation alert. Analogously with FIG. 2, air traffic data system 100 of FIG. 1 may be implemented on ownship 302, may receive information on recent trajectories of ownship 302 and target aircraft 304, and may generate predicted future trajectories of ownship 302 and target aircraft 304. Also analogously with FIG. 2, ownship 302 has recently been flying along a straight trajectory 312, and target aircraft 304 has recently been turning with a constant turn rate trajectory 314. Also analogously with FIG. 2, air traffic data system 100 on ownship 302 may receive information on the trajectory of ownship 302 from other systems aboard ownship 302, and may receive information (e.g., in ADS-B reports) from target aircraft 304 containing information on the trajectory of target aircraft 304. And analogously with FIG. 2, air traffic data system 100 on ownship 302 may extrapolate from recent straight trajectory 312 that ownship 302 will remain on a straight predicted trajectory 322 that continues at the same speed, direction, and altitude of recent trajectory 312.

Target aircraft 304 may have recently had a constant turn radius turning trajectory 314 because aircraft 304 was making a 90 degree turn or 180 degree turn, for example. As mentioned above, a traditional air traffic alert system without procedural trajectory prediction may extrapolate that recent constant turn radius turning trajectory 314 to naïvely predict that aircraft 304 will remain in a future trajectory 324 that continues turning in a continuation of the same constant turn rate. This is a trajectory "wrap-around effect" of the predicted trajectory 324 of target aircraft 304 continuing in repeating circles. In this predicted trajectory 324 that might be naïvely made by a traditional air traffic alert system, target aircraft 304 is predicted to occupy future position 334 at the same time that ownship 302 is predicted to occupy future position 332, thereby resulting in a protected airspace violation.

However, this "wrap-around effect" of aircraft 304 flying in circles may be unlikely and unrealistic in a real flight scenario, as may be reflected in the more sophisticated procedural trajectory predictions implemented by TSAA system 106 of this disclosure. TSAA system 106 of this disclosure may implement procedural trajectory prediction algorithms that incorporate procedural trajectory information, or may in process of executing its instructions make reference to in-memory data cache (or other data store) containing procedural trajectory information. TSAA system 106 of this disclosure may effectively discern from its procedural trajectory information that target aircraft 304 should be following the expected flight procedures or protocols for its current situation, e.g., following air lane or traffic pattern protocols of the proximate airport. TSAA system 106 of this disclosure may further determine from this procedural context in combination with the information on the recent trajectory 314 of target aircraft 304, that target aircraft 304 is about to come out of its turn at the constant turn angle trajectory 314 and begin pursuing a straight trajectory 326, that will put target aircraft 304 at position 336 when ownship 302 is at position 332.

TSAA system 106 of this disclosure may therefore make use of stored procedural trajectory information to make a procedural trajectory prediction that target aircraft 304 is about to pursue a straight-line trajectory 326 and that there is not a risk of imminent protected airspace violation between ownship 302 and target aircraft 304. TSAA system 106 of this disclosure may therefore avoid a false positive nuisance alert that might likely be generated by a naive traditional air traffic alert situation in this scenario. Conversely, TSAA system 106 of this disclosure may also generate a timely imminent airspace violation alert when a traditional system would generate an alert late or fail to generate an alert at all in cases in which a naive wrap-around effect prediction would not enable a timely prediction of a protected airspace violation but in which a procedural trajectory prediction using procedural trajectory information could enable a timely prediction.

Figure 5:
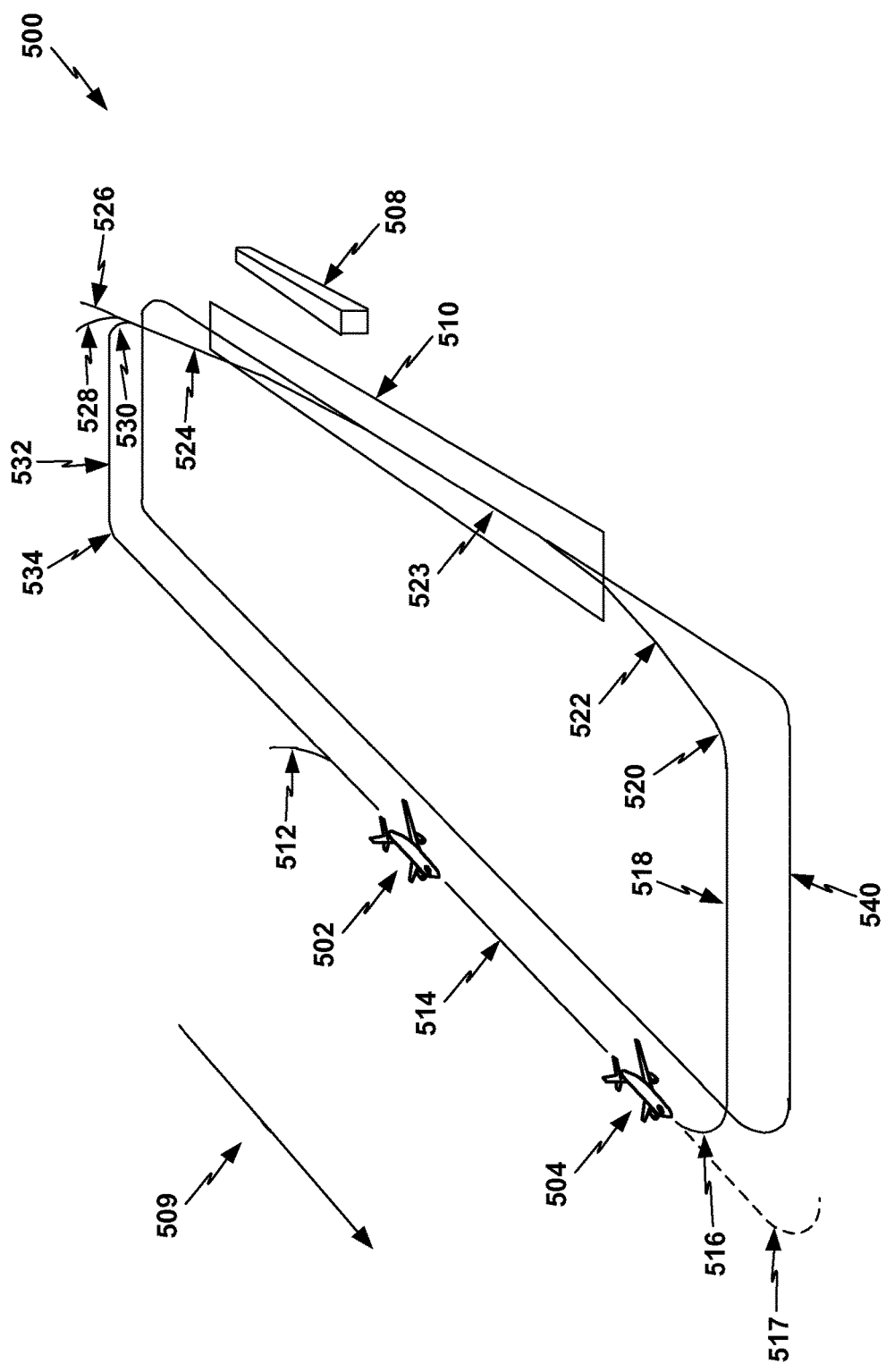
FIG. 5 shows a conceptual perspective diagram of an airport airspace around a general aviation airport in a representative example of two aircraft, an ownship and a target aircraft, in flight in accordance with a standard procedural flight pattern as may be predicted by an example TSAA system of this disclosure performing procedural trajectory prediction using procedural trajectory information.

FIG. 5 shows a conceptual perspective diagram of an airport airspace 500 around a general aviation airport in a representative example of two aircraft, an ownship 502 and a target aircraft 504, in flight in accordance with a standard procedural flight pattern as may be predicted by TSAA system 106 of this disclosure performing procedural trajectory prediction using procedural trajectory information 138. FIG. 5 shows an example procedural traffic pattern for takeoffs from and landings on runway 510 with wind direction 509 parallel to runway 510 with downwind to the left relative to an observer at airport terminal 508 facing runway 510, indicating a left-turn air traffic configuration according to procedural air traffic standards (to ensure takeoff into the wind). In cases where the wind direction is opposite to wind direction 509 as shown in FIG. 5, procedural flight standards may indicate similar flight patterns but in opposite directions, in a right-turn air traffic configuration. Ownship 502 may enter the procedural pattern at entry turn 512, placing ownship 502 in downwind track 514 behind target aircraft 504. Standard flight procedure may indicate for target aircraft 504 and ownship 502 to follow downwind track 514, base turn 516 into base track 518, and final approach turn 520 to final approach 522 and landing 523, along with steadily reducing speed along this path.

Standard flight procedure for aircraft taking off from runway 510 may include accelerating along track 523 to liftoff into departure track 524. Depending on its intended heading, an aircraft in takeoff may continue ascending along a straight line path 526, a shallow turn 528, or a crosswind turn 530 into crosswind track 532, and a subsequent left turn 534 if continuing on a heading opposite to the direction of takeoff. FIG. 5 also shows path 540 as the ground track below and corresponding to the procedural flight tracks 512-534. Various aircraft in flight in the airspace of airport terminal 508 may be guided by an air traffic control (ATC) tower, or in airports without an ATC tower, the aircraft may fly in accordance with visual acquisition and observation of other aircraft traffic and adherence to standard flight rules and other procedures, such as pursuing the flight tracks 512-534 as described above and maintaining minimum separations from any surrounding target aircraft.

In some circumstances, the aircraft 502 and 504 as shown in FIG. 5 may follow tracks 514, 516, 518, 520, 522, and 523 in order just as shown in FIG. 5 and separated by a standard procedural separation distance along tracks 514-523 throughout the process; while in other circumstances, some deviations from both aircrafts' adherence to this sequence of tracks may occur. In one example without any deviations, aircraft 502 and 504 may begin from the positions as shown in FIG. 5 at a minimum standard procedural separation from each other, when target aircraft 504 begins executing base leg turn 516. Target aircraft 504 may be flying at a lower speed than ownship 502 since it is further along in the process of decelerating for its landing. With traditional onboard air traffic alert systems, in contrast to ASSAP tracker 104 and TSAA system 106 using procedural trajectory prediction as in this disclosure, it would be possible for an onboard air traffic alert system on ownship 502 to detect target aircraft 504 performing base leg turn 516 at a constant turn radius, perform trajectory predictions by naively extrapolating target aircraft 504 continuing in the same constant turn radius in a repeated circular path (the "wrap-around effect"), predict that ownship 502 will intercept target aircraft 504 when ownship 502 reaches the position of base leg turn 516, and generate a false positive nuisance alert for an imminent airspace violation or collision.

In contrast, ASSAP tracker 104 and TSAA system 106 may include procedural trajectory information 138 which may include information on procedural flight tracks 512-534 as described above, and may include information that these procedural flight tracks 512-534 are applicable to the present situation proximate to airport terminal 508 and runway 510. TSAA system 106 using procedural trajectory prediction as in this disclosure may detect that target aircraft 504 is executing base leg turn 516, and procedural trajectory prediction unit 134 may access procedural trajectory information 138 to generate a prediction that target aircraft 504 will perform base leg turn 516 as only an approximately 90 degree turn and then straighten out course and follow straight base leg track 518. TSAA system 106 using procedural trajectory prediction unit 134 may base this prediction on any of a variety of procedural information sources accessible within procedural trajectory information 138, such as the A/FD, a commercial navigation database, algorithmic encoding of standard traffic pattern operations, data generated from an onboard autonomous system for airport configuration and parameter recognition, or other examples as discussed above.

Examples of an onboard autonomous system for airport configuration and parameter recognition (or autonomous airport configuration recognition system) are further described as follows. Procedural trajectory information 138 may include information from an onboard autonomous airport configuration recognition system, that procedural trajectory prediction unit 134 may also use, potentially in combination with other information sources, in determining predicted trajectories for target aircraft. In some examples, an autonomous airport configuration recognition system may receive aircraft state information from another aircraft, such as in ADS-B messages, when the other aircraft is landing at or taking off from a runway, and determining the location of the runway based on the received aircraft state information. Determining the location of the runway may include determining coordinates of points along an approximated centerline of the runway, such as points at or aligned with the locations of the other aircraft from just before landing until turning off of the runway, or from turning onto the runway until just after liftoff. An autonomous airport configuration recognition system may be implemented in a separate system or device from TSAA system 106, such as in a separate system, component, and/or set of algorithms implemented in TCAS computer 102. In other examples, an autonomous airport configuration recognition system may be implemented as part of TSAA system 106.

TSAA system 106 using procedural trajectory prediction unit 134 may therefore predict, correctly, that no risk of protected airspace violation between ownship 502 and target aircraft 504 is imminent, and may avoid generating a nuisance alert. TSAA system 106 using procedural trajectory prediction unit 134 may further predict, at further extrapolation based on procedural trajectory information 138, that target aircraft 504 will subsequently continue following the procedural standard flight path along approach turn 520, final approach 522, and landing 523 as shown.

In other examples, typical deviations from standard procedural flight paths may affect how the flight tracks of the various aircraft are interpreted by ASSAP tracker 104 and TSAA system 106. In one example, beginning from the positions of aircraft 502 and 504 along downwind track 514 as shown in FIG. 5, an ATC tower (not shown) may instruct target aircraft 504 to extend its straight-line path in line with downwind track 514 and delay making its base leg turn, to maintain sufficient separation from another aircraft (not shown) ahead of it that is currently in final approach 522 for landing. Target aircraft 504 may thus continue along track 517 to a later base leg turn, while also continuing to decelerate. Ownship 502 may at the same time continue flying along downwind track 514 at a higher speed than target aircraft 504 and still planning on performing base leg turn 516 at the position shown in FIG. 5 in accordance with standard operating procedure.

Figure 6:
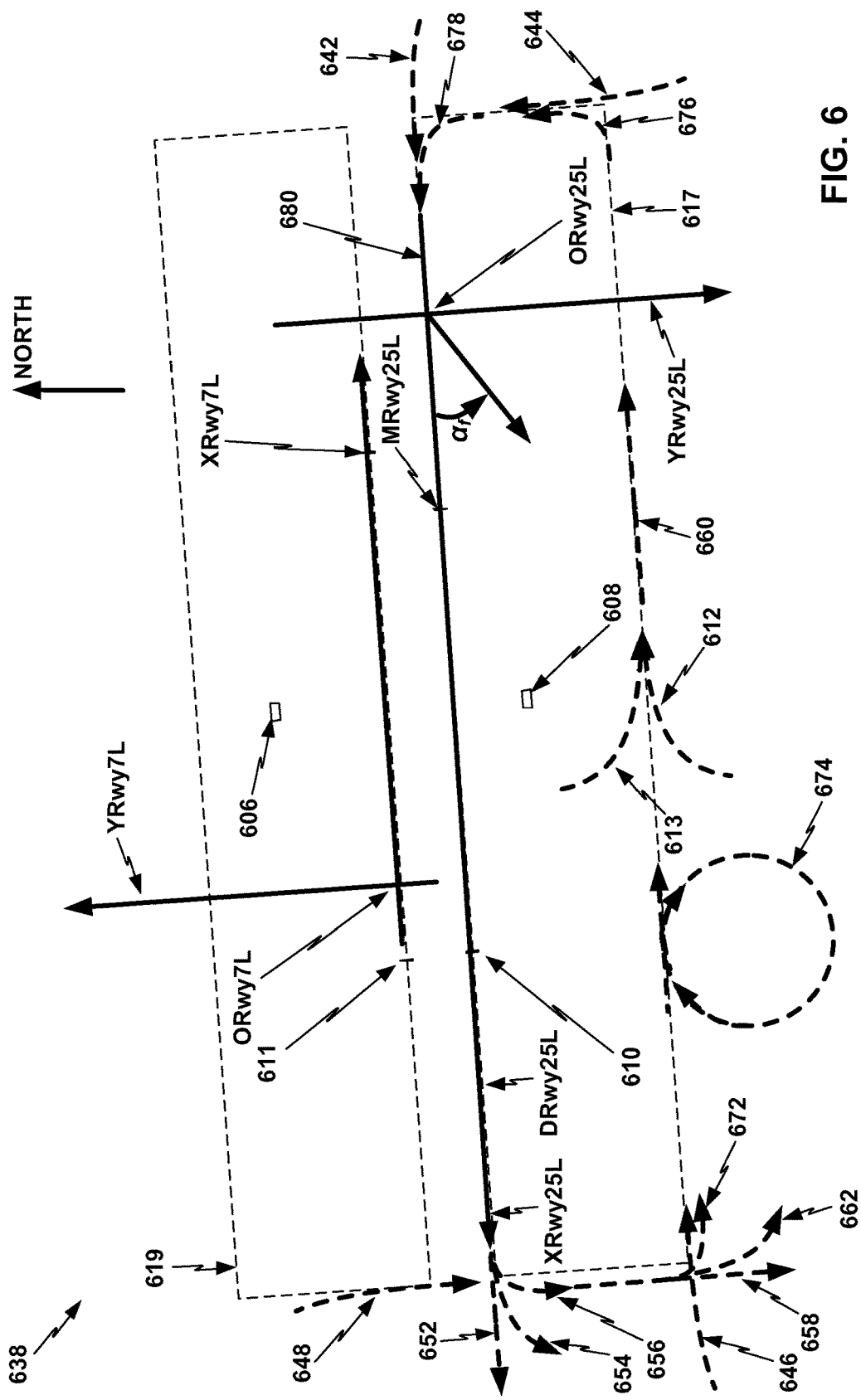
FIG. 6 depicts an example schematic representation of an example set of airspace procedural trajectory information associated with an airspace around a selected airport, including indications of procedural air traffic patterns in the vicinity of the airspace around the selected airport, all as may be stored or implemented in procedural trajectory information as part of a procedural trajectory prediction unit as in FIGS. 1 and 3.

FIG. 6 depicts a schematic representation of a set of example airspace procedural trajectory information 638 associated with an airspace around a selected airport, including indications of procedural air traffic patterns in the vicinity of the airspace around the selected airport, all as may be stored or implemented in procedural trajectory information 138 as part of procedural trajectory prediction unit 134 of FIGS. 1 and 3. The information represented by procedural trajectory information 638 as shown in FIG. 6 may be stored and/or implemented in any of various numerical, vector, array, matrix, and/or graphical formats or types of data and/or algorithmic executable instructions, in or as part of procedural trajectory information 138. The airport and its airspace represented by procedural trajectory information 638 may also be referred to as airport 638 below for convenience.

Procedural trajectory information 638 may include data and information from one or more sources, such as A/FD, a commercial navigation database, a set of standard air traffic procedural rules, and/or other examples as discussed above. A portion of procedural trajectory information 638 may correspond to an airport diagram from A/FD, in some examples. Airport 638 as represented in procedural trajectory information 638 has two parallel runways 610, 611, a terminal 608, and an air traffic control (ATC) tower 606. Various different traffic patterns applicable to airspace 600 in different contexts may be stored in procedural trajectory information 638. Procedural trajectory information 138 may also include additional procedural trajectory information for many other airports and their site-specific air traffic patterns.

Procedural trajectory prediction unit 134 may be configured to determine predicted trajectories in the airspace around the airport of FIG. 6 with respect both to general air traffic information and site-specific information applicable to this airport in particular. Procedural trajectory prediction unit 134 may further be enabled to predict procedurally informed trajectories for any of various air traffic procedural factors such as parallel runway approach, air traffic transition to opposite runway headings in response to a change in wind direction.

Trajectory propagation unit 133 may implement separate algorithmic modules, libraries, or portions for categorizing aircraft trajectory tracks into track categories, and for defining how to propagate or extrapolate aircraft trajectory tracks in the track categories. Trajectory propagation unit 133 may also apply a set of correlation criteria to determine whether to use of procedural trajectory prediction unit 134 or to apply other modes of trajectory propagation such as straight-line track or constant track angle as discussed above.

FIG. 6 shows a runway threshold oriented reference frame for each of the involved runways 610 and 611. A reference frame may be defined in terms of the following reference points and lines, for airport airspaces in general (and with specific reference to airspace 638 in parentheses). The point O (e.g., ORwy7L and ORwy25L in FIG. 6) defines an intersection of runway threshold line Y (e.g., YRwy7L, Yrwy25L, respectively) and horizontal runway centerline X (e.g., XRwy7L, XRwy25L, respectively) at Mean Sea Level (MSL) vertically. The X axis(e.g., XRwy7L, XRwy25L in FIG. 6) is defined along a runway centerline longitudinally on a local level plane (e.g., for runways 610, 611 in FIG. 6), and defined as positive in the current direction of departure. The Y axis (e.g., YRwy7L, YRwy25L in FIG. 6) is defined perpendicular to the runway centerline on the local level plane (e.g., for runways 610, 611 in FIG. 6), and defined as positive in the leftward direction relative to the current direction of departure. A Z axis (not shown) may also be defined vertical to the local level plane, defined as positive in the upward direction.

Airspace procedural trajectory information 638 may define expressions and notations to support processes, algorithms, and/or data for the procedural trajectory prediction unit 138. Procedural trajectory information 638 may include a point D (e.g., DRwy25L in FIG. 6; corresponding point in runway 611 not shown) to represent a departure runway threshold line, and a point M (e.g., MRwy25L in FIG. 6) to mark one-third of the nominal runway departure distance, such that the line segment MO (between the points M and O) equals the first one-third of the line segment DO (between the points D and O). Procedural trajectory information 638 may also include or define the following expressions: TPAL—Traffic Pattern Altitude for Single Engine Aircraft; TPAU—Traffic Pattern Altitude for Multi Engine Aircraft; ARP—Airport Reference Point (which may define, e.g., the center of an airport or of the airport's airspace); z—Corrected Barometric Altitude; IAS—Indicated Airspeed (may be optional, IAS is not always available to all aircraft enabled for ADS-B Out); Rp(p)—Planar Range from aircraft to point of P (or horizontal range from a vertical axis defined intersecting a point P); $\alpha_f$—normalized angle between the airplane track angle and the approaching runway heading (e.g., XRwy25L), defined with counterclockwise (as shown in FIG. 6) as positive; and $\dot{\alpha}_f$—Track Angle Rate, or rate of change of angle$\alpha_f$.

Procedural trajectory prediction unit 134 may also make use of additional information, including any one or more of the following, to perform procedural trajectory prediction: altimeter setting of the ownship; departure runway threshold position for a particular runway; approach runway threshold position for a particular runway; runway heading for a particular runway; traffic pattern altitude for single engine aircraft around airport 638; traffic pattern altitude for multi-engine aircraft around airport 638; traffic pattern direction (e.g., left-turn or right-turn) around airport 638; one or more airport reference points; indicated airspeed of the ownship and/or target aircraft (may be optional; if this parameter is not available, ground speed can be a substitute with modified criteria, or algorithm may ignore the related criteria); emitter category of the ownship and/or target aircraft; and a joining pattern for joining a particular track around airport 638, for example. For example, the emitter category of a target aircraft may indicate the size of the target aircraft, and procedural trajectory prediction unit 134 may correlate a larger aircraft size with larger dimensions of its procedural traffic pattern as appropriate. Additionally, while procedural trajectory prediction by procedural trajectory prediction unit 134 is discussed herein with reference to certain air traffic patterns, procedural trajectory prediction unit 134 may also perform procedural trajectory prediction in accordance with additional traffic patterns beyond those discussed in detail herein, such as a Standard Instrument Departure (SID), a Standard Terminal Arrival (STAR), or other examples of National Airspace System (NAS) air traffic patterns, for example.

Air traffic data system 100 incorporating TSAA system 106 with procedural trajectory prediction unit 134 as shown in FIGS. 1 and 3 may begin tracking and evaluating an aircraft (either target aircraft or ownship) for procedural trajectory prediction when the aircraft enters the airspace of airport 638. Procedural trajectory prediction unit 134 may apply a set of criteria for determining whether to introduce a new aircraft into its procedural trajectory prediction tracking processes. For example, a core surface area of a Class C airspace may have a radius of five nautical miles, and has a rule against operating an aircraft at or below 2,500 feet (about 762 meters) above the surface within four nautical miles of the primary airport of a Class C airspace area at an indicated airspeed of more than 200 knots.

Procedural trajectory prediction unit 134 may therefore apply a joining pattern candidate criterion of whether Rp(ARP)<=4 NM, or whether the planar range from the aircraft to the airport reference point is less than or equal to four nautical miles. Procedural trajectory prediction unit 134 may apply a different distance less than or greater than four nautical miles in some implementations. Procedural trajectory prediction unit 134 may also apply another joining pattern candidate criterion for aircraft speed, e.g., IAS<=200 kt, or whether the indicated airspeed is less than or equal to 200 knots, or other selected value for speed. While an aircraft that fulfills the requirement of being within four nautical miles of the airport reference point should not be exceeding the airspace speed defined by the rules for that airport, this may be considered an indication that the aircraft is only passing through the airspace and will not be joining its air traffic pattern, so it may be unproductive to begin tracking it for procedural trajectory prediction.

Procedural trajectory prediction unit 134 may track an aircraft from the aircraft's initial entry into the relevant airspace as described above (e.g., into airspace 638) to the aircraft's entry into the standard procedural traffic pattern around the airport (e.g., flight tracks 514-534 as shown in FIG. 5; dashed rectangles 617, 619 in FIG. 6 intersecting runways 610, 611 respectively).Procedural trajectory prediction unit 134 may also first acquire a target aircraft when it is already in the standard traffic pattern 617, 619, in which case it may add that target aircraft to its tracking without going through a prior process of tracking that target aircraft from an initial acquisition in the airspace to joining the standard traffic pattern. Procedural trajectory prediction unit 134 may therefore categorize a target aircraft's trajectory into a predicted procedural trajectory based at least in part on the target aircraft's recent trajectory meeting one or more conditions specific to the predicted procedural trajectory for the one or more criteria. In other words, procedural trajectory prediction unit 134 may select a predicted procedural trajectory for the target aircraft based at least in part on one or more flight variables of the target aircraft (e.g., position, speed, velocity, altitude, rate of change of altitude) meeting one or more conditions specific to the predicted procedural trajectory for the one or more criteria, as further explained below.

Procedural trajectory prediction unit 134 may include data and/or algorithms related to various trajectories for joining a standard traffic pattern, e.g., standard traffic pattern 617 or standard traffic pattern 619. For example, in some cases, a trajectory for joining standard traffic pattern 617 may involve entering the pattern in a standard entry 612 in level flight, abeam the midpoint of the runway (or antiparallel to the midpoint of the runway), at standard traffic pattern altitude. Procedural trajectory prediction unit 134 may include data and/or algorithms related to many other procedural trajectories for joining standard traffic pattern 617, such as teardrop entry 613, straight in entry 642, direct base entry 644, direct downwind entry 646, and crosswind entry 648. Examples of qualifying criteria for categorizing a target aircraft's trajectory into one of these approach trajectories, or selecting a predicted procedural trajectory as a match for the target aircraft's recent trajectory, and trajectory propagation rules for these approach trajectories, are further described below.

Standard entry 612 may involve an aircraft approaching airport 634 for landing, and entering traffic pattern 617 at a 45° angle to the downwind leg, headed toward a point abeam of the midpoint of the runway 610 to be used for landing. Arriving aircraft should be at the proper traffic pattern altitude before entering traffic pattern 617, and should stay clear of the traffic flow until established on the entry leg. In one example, procedural trajectory prediction unit 134 may apply the following example criteria to categorize an aircraft as adhering to standard entry 612:

O<x<D (position x is between O and D)

$\dot{x}$<=−30 kt (negative x-direction vector of speed less than or equal to 30 knots)

y>0.5 SM for left pattern; y<−0.5 SM for right pattern (where SM may be a selected applicable distance from point M on the runway)

if y<0, $\dot{y}$>=0; if y>=0, $\dot{y}$<=0 (i.e., the aircraft's y position is approaching 0)

TPAL<=z<=TPAU (the aircraft's z value is between TPAL and TPAU)

−50 ft/min<=$\dot{z}$<=50 ft/min (the aircraft's z-direction vector of speed is less than or equal to 50 ft/minute in either upward or downward)

if y<0, 105 degrees<=$\alpha_f$<180 degrees;

if y>=0, −180 degrees<=$\alpha_f$<=−105 degrees if y<0, $\dot{\alpha}_f$>=0 deg/sec; if y>=0, $\dot{\alpha}_f$<=0 deg/sec In other examples, procedural trajectory prediction unit 134 may apply criteria such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of standard entry 612, procedural trajectory prediction unit 134 may perform procedural trajectory prediction for that aircraft in accordance with a set of trajectory propagation rules specified for standard entry 612. In some examples, one relatively simple set of rules for trajectory propagation for standard entry 612 may include propagating the aircraft's trajectory along a constant track angle until the predicted track is antiparallel to runway 610, then propagating the trajectory in a straight line antiparallel to runway 610, following standard traffic pattern 617, and/or until the limit of propagation.

For the example of teardrop entry 613 (e.g., in which an aircraft crosses the runways or midfield to join standard traffic pattern 617 in a mirror image of standard entry 612), procedural trajectory prediction unit 134 may categorize an aircraft's trajectory as teardrop entry 613 if it meets the following example criteria, much of which may be understood with reference to analogous features as described above for standard entry 612:

0<x<D
$\dot{x}$<=−30 kt
0 SM<y<=1 SM for left pattern; −1 SM<=y<0 SM for right pattern
if y<0, $\dot{y}$<=0; if y>=0, $\dot{y}$>=0
TPAL<=z<=TPAU
−50 ft/min<=$\dot{z}$<=50 ft/min
if y<0, −180 deg<=$\alpha_f$<=−135 deg; if y>=0, 135 deg<=$\alpha_f$<180 deg
if y<0, $\dot{\alpha}_f$<=0 deg/sec; if y>=0, $\dot{\alpha}_f$>=0 deg/sec Therefore, in this example, procedural trajectory prediction unit 134 evaluates flight variables of the target aircraft's recent trajectory and applies criteria to these flight variables, including its x and y positions, x and y velocities, altitude (z), rate of change in altitude ($\dot{z}$), all with respect to coordinates of the local airport, and angle and rate of change of angle of trajectory ($\alpha_f$ and $\dot{\alpha}_f$) with respect to a selected runway of the local airport. Procedural trajectory prediction unit 134 then selects a predicted procedural trajectory for the target aircraft based at least in part on the at least one flight variable of the target aircraft meeting one or more conditions specific to the predicted procedural trajectory for the one or more criteria, as further explained below. Several additional examples are described further below of specific predicted procedural trajectories for which procedural trajectory prediction unit 134 may evaluate flight variables of the target aircraft's recent trajectory and apply criteria to these flight variables to select a predicted procedural trajectory for the target aircraft based at least in part on the one or more flight variables of the target aircraft meeting one or more conditions specific to the predicted procedural trajectory for the one or more criteria.

In other examples, procedural trajectory prediction unit 134 may apply criteria for teardrop entry 613 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of teardrop entry 613, procedural trajectory prediction unit 134 may perform procedural trajectory prediction for that aircraft in accordance with a set of trajectory propagation rules specified for teardrop entry 613. In some examples, one relatively simple set of rules for trajectory propagation for teardrop entry 613 may include propagating the aircraft's trajectory along a constant track angle (approaching from midfield or over runway 610) until the predicted track is antiparallel to runway 610, then propagating the trajectory in a straight line antiparallel to runway 610, following standard traffic pattern 617, and/or until the limit of propagation.

In the example of straight in entry 642, an aircraft aligns with the runway centerline of runway 610 (runway 25R) and starts descending, with minor adjustment or correction to maintain the track to the runway. The adjustment or correction may introduce intermittent track angle change. Procedural trajectory prediction unit 134 may categorize an aircraft's trajectory as straight in entry 642 if it meets the following example criteria, much of which may be understood with reference to analogous features as described above:
x<−0.5 SM
$\dot{x}$<=50 kt
−1500 ft<=y<=1500 ft
if y<0, $\dot{y}$>=−5 kt; if y>=0, $\dot{y}$<=5 kt
z<=TPAU
$\dot{z}$<50 ft/min
if y<0, 0 deg<=$\alpha_f$<30 deg; if y>=0, −30 deg<=$\alpha_f$<=0 deg
if y<0, $\dot{\alpha}_f$<=0 deg/sec; if y>=0, $\dot{\alpha}_f$>=0 deg/sec In other examples, procedural trajectory prediction unit 134 may apply criteria for straight in entry 642 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of straight in entry 642, procedural trajectory prediction unit 134 may perform procedural trajectory prediction for that aircraft in accordance with a set of trajectory propagation rules specified for straight in entry 642. In some examples, one relatively simple set of rules for trajectory propagation for straight in entry 642 may include propagating the aircraft's trajectory along a constant track angle until the predicted track angle aligns with the runway heading of runway 610, then propagating the trajectory in a straight line along the runway heading of runway 610, and/or until the limit of propagation.

In the example of direct base entry 644, the aircraft joins the base leg of standard traffic pattern 617 and pursues a track perpendicular to the centerline of runway 610 in preparation for a right-angle turn to intercept the centerline of runway 610. Procedural trajectory prediction unit 134 may categorize an aircraft's trajectory as direct base entry 644 if it meets the following example criteria, much of which may be understood with reference to analogous features as described above:
x<=−0.5+0.3 SM
−30<=$\dot{x}$<=30 kt
y>0.5 SM for left pattern; y<−0.5 SM for right pattern
If y<0, $\dot{y}$>50 kt; if y>=0, $\dot{y}$<−50 kt
z<=TPAU
$\dot{z}$<=e.g., 50 ft/min
if y<0, 90−30 deg<=$\alpha_f$<=90+30 deg;
if y>=0, −90−30 deg<=$\alpha_f$<=−90+30 deg
if 0 deg<=$\alpha_f$<90 deg or −90 deg<$\alpha_f$<=−180 deg, $\dot{\alpha}_f$>=0 deg/sec;
if 90 deg<=$\alpha_f$<180 deg or 0 deg<$\alpha_f$<=−90 deg, $\dot{\alpha}_f$<=0 deg/sec In other examples, procedural trajectory prediction unit 134 may apply criteria for direct base entry 644 such as those above with any of a variety of other values, and/or omit one or more of the criteria listed above, and/or apply one or more additional criteria. In this example (and in some examples below), some values are given in terms of an algebraic expression among two constants (e.g., −90 −30 degrees) which may refer to the second constant being an example that may be varied relative to the first constant in some classes of implementations (the total value may also be varied in other implementations). If an aircraft meets all of the criteria applied by procedural trajectory prediction unit 134 for categorizing the aircraft in a trajectory of direct base entry 644, procedural trajectory prediction unit 134 may perform procedural trajectory prediction for that aircraft in accordance with a set of trajectory propagation rules specified for direct base entry 644. In some examples, one set of rules for trajectory propagation for direct base entry 644 may include propagating the aircraft's trajectory along a constant track angle until the predicted track angle is aligned perpendicularly to the runway heading of runway 610, then propagating the trajectory in a straight line perpendicular to runway 610, and/or until the limit of propagation.

In the example of direct downwind entry 646, the aircraft joins the antiparallel leg of standard traffic pattern 617, opposite the direction procedurally indicated for landing on runway 610, and pursues a track the antiparallel leg of standard traffic pattern 617 ahead of the typical entry points of the standard entry 612 and the teardrop entry 613.

Procedural trajectory prediction unit 134 may categorize an aircraft's trajectory as direct downwind entry 646 if it meets the following example criteria, much of which may be understood with reference to analogous features as described above:

x>=D+0.5 SM
$\dot{x}$<=−50 kt
0.5−0.1 SM<y<1+0.5 SM for left pattern;−1−0.5 SM<y<−0.5+0.1 SM for right pattern
−30 kt<=$\dot{y}$<=30 kt
TPAL<=z<=TPAU
−50 ft/min<=$\dot{z}$<=50 ft/min
180−30 deg<=$\alpha_f$<180 deg or −180 deg<=$\alpha_f$<=−180+30 deg
   if 180−TBD(30) deg<=$\alpha_f$<180 deg, $\dot{\alpha}_f$=0 deg/sec;
   if −180 deg<=$\alpha_f$<=−180+TBD(30), $\dot{\alpha}_f$<=0 deg/sec In other examples, procedural trajectory prediction unit 134 may apply criteria for direct downwind entry 646 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of direct downwind entry 646, procedural trajectory prediction unit 134 may perform procedural trajectory prediction for that aircraft in accordance with a set of trajectory propagation rules specified for direct downwind entry 646. In some examples, one set of rules for trajectory propagation for direct downwind entry 646 may include propagating the aircraft's trajectory along a constant track angle until the predicted track angle is aligned antiparallel to the runway heading of runway 610 and in line with antiparallel leg of standard traffic pattern 617, then propagating the trajectory in a straight line along antiparallel leg of standard traffic pattern 617, and/or until the limit of propagation.

In the example of an aircraft approaching the indicated trajectory of crosswind entry 648, an aircraft would typically enter standard traffic pattern 619 for landing on runway 611, or in some circumstances in which landing on runway 610 is desired, would proceed to teardrop entry 613, but may also perform crosswind entry 648 in some circumstances. In this case, the aircraft enters standard traffic pattern 617 at its crosswind leg, preparatory to pursuing its antiparallel leg and base leg before final approach and landing on runway 610. Procedural trajectory prediction unit 134 may categorize an aircraft's trajectory as crosswind entry 648 if it meets the following example criteria, much of which may be understood with reference to analogous features as described above:

D−0.1 SM<=x<=D+0.5 SM
−30 kt<=$\dot{x}$<=30 kt
−0.5 SM<=y<=0 SM for left pattern; 0 SM<=y<=0.5 SM for right pattern
|$\dot{y}$|>=50 kt
TPAL<=z<=TPAU
−50 ft/min<=$\dot{z}$<=50 ft/min
   if y<0, 90−30 deg<=$\alpha_f$<=90+30 deg;
   if y>=0, −90−30 deg<=$\alpha_f$<=−90+30 deg
   if 0 deg<=$\alpha_f$<90 deg or −90 deg<$\alpha_f$<=−180 deg, $\dot{\alpha}_f$=0 deg/sec; if 90 deg<=$\alpha_f$<180 deg or 0 deg<$\alpha_f$<=−90 deg, $\dot{\alpha}_f$<=0 deg/sec In other examples, procedural trajectory prediction unit 134 may apply criteria for crosswind entry 648 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of crosswind entry 648, procedural trajectory prediction unit 134 may perform procedural trajectory prediction for that aircraft in accordance with a set of trajectory propagation rules specified for crosswind entry 648. In some examples, one set of rules for trajectory propagation for crosswind entry 648 may include propagating the aircraft's trajectory along a constant track angle until the predicted track angle is aligned perpendicular to the runway heading of runway 610 and in line with the crosswind leg of standard traffic pattern 617, then propagating the trajectory in a straight line along the crosswind leg of standard traffic pattern 617, and/or until the limit of propagation.

Procedural trajectory prediction unit 134 may also include data and/or algorithms related to various trajectories for departing a standard traffic pattern, e.g., traffic pattern 617, and for taking off and departing an airport. Procedural trajectory prediction unit 134 may include data and/or algorithms related to various trajectories for departing standard traffic pattern 617, such as upwind straight out departure 652, upwind 45 degree departure 654, upwind departure with crosswind turn 656, crosswind straight out departure 658, straight out downwind departure 660, or angled downwind departure 662. Examples of qualifying criteria for categorizing an aircraft's flight into one of these departing trajectories, and trajectory propagation rules for these departing trajectories, are further described below. Procedural trajectory prediction unit 134 may categorize an aircraft's trajectory as one of these departure trajectories if it meets at least the following example criteria, in combination with more specific criteria for particular types of departures: Rp(ARP)<=3 NM, and optionally, IAS<=150 kt.

In the example of an upwind straight out departure 652, an aircraft takes off from runway 610 and ascends on a straight line track 652 (in the same direction as landings). Procedural trajectory prediction unit 134 may categorize an aircraft's trajectory as upwind straight out departure 652 if it meets the following example criteria:

Rp(ARP)<=3 NM
x>M
$\dot{x}$>=TBD (50) kt
|y|<TBD(0.1) SM
|$\dot{y}$|<=TBD(15) kt
z<=TPAU+1000 ft
$\dot{z}$>=e.g., 0 ft/min
|$\alpha_f$|<=15 deg
|$\dot{\alpha}_f$|=0 deg/sec In other examples, procedural trajectory prediction unit 134 may apply criteria for upwind straight out departure 652 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of upwind straight out departure 652, procedural trajectory prediction unit 134 may perform procedural trajectory prediction for that aircraft in accordance with a set of trajectory propagation rules specified for upwind straight out departure 652. In some examples, one set of rules for trajectory propagation for upwind straight out departure 652 may include propagating the aircraft's trajectory along a constant straight line track in line with runway 610, and/or until the limit of propagation.

In the example of an upwind 45 degree departure 654, an aircraft takes off from runway 610 in the upwind direction and turns at a track angle of approximately 45 degrees as it ascends to traffic pattern altitude, along upwind 45 degree departure 654 (to the left when in a left-hand traffic pattern, and to the right when in a right-hand traffic pattern). Procedural trajectory prediction unit 134 may categorize an aircraft's trajectory as upwind 45 degree departure 654 if it meets the following example criteria:

x>D
$\dot{x}$>=30 kt
0 SM<y<0.5 SM for left pattern; −0.5 SM<y<0 SM for right pattern
if y<0, $\dot{y}$<0 kt; if y>=0, $\dot{y}$>0 kt
z>=TPAL−300−100 ft
$\dot{z}$>0 ft/min
0 deg<$\alpha_f$<45 +15 deg for left pattern;−45−TBD(15) deg<$\alpha_f$<0 deg for right pattern
$\dot{\alpha}_f$>0 deg/sec for left pattern; $\dot{\alpha}_f$<0 deg/sec for right pattern In other examples, procedural trajectory prediction unit 134 may apply criteria for upwind 45 degree departure 654 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of upwind 45 degree departure 654, procedural trajectory prediction unit 134 may perform procedural trajectory prediction for that aircraft in accordance with a set of trajectory propagation rules specified for upwind straight out departure 652. In some examples, one set of rules for trajectory propagation for upwind straight out departure 652 may include propagating the aircraft's trajectory along a constant track angle of 45 degrees from the axial line XRwy25L of runway 610, followed by a straight line trajectory beginning from the end of the 45 degree turn, and/or until the limit of propagation. This set of rules may also include a special alert to remain prepared to revise the predicted trajectory early if new incoming information indicates that the target aircraft begins pulling out of the turn and straightening its track earlier or later than for a 45 degree turn.

In the example of an upwind departure with crosswind turn 656, an aircraft takes off from runway 610 in the upwind direction and commence a turn at a track angle of approximately 90 degrees, following the crosswind leg of standard traffic pattern 617, within 300 feet of traffic pattern altitude, along upwind departure with crosswind turn 656 (to the left when in a left-hand traffic pattern, and to the right when in a right-hand traffic pattern). Procedural trajectory prediction unit 134 may categorize an aircraft's trajectory as upwind departure with crosswind turn 656 if it meets the following example criteria:

D<x<=D+TBD(2) SM
$\dot{x}$<=50 kt
0 SM<y<0.5 SM for left pattern; −0.5 SM<y<0 SM for right pattern
if y<0, $\dot{y}$<0; if y>=0, $\dot{y}$>0
TPAL−300 ft<=z<=TPAU
−50 ft/min<=$\dot{z}$<=50 ft/min
if y<0, −90 deg<=$\alpha_f$<=−TBD(60) deg; if y>=0, TBD(60) deg<=$\alpha_f$<90 deg
if y<0, $\dot{\alpha}_f$<0 deg/sec; if y>=0, $\dot{\alpha}_f$>0 deg/sec In other examples, procedural trajectory prediction unit 134 may apply criteria for upwind departure with crosswind turn 656 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of upwind departure with crosswind turn 656, procedural trajectory prediction unit 134 may perform procedural trajectory prediction for that aircraft in accordance with a set of trajectory propagation rules specified for upwind departure with crosswind turn 656. In some examples, one set of rules for trajectory propagation for upwind departure with crosswind turn 656 may include propagating the aircraft's trajectory along a constant track angle of 90 degrees from the axial line XRwy25L of runway 610, then straightening into a straight track perpendicular to the axial line XRwy25L of runway 610 along or parallel to the crosswind leg of standard traffic pattern 617, and/or until the limit of propagation.

The example of an upwind departure with crosswind turn 656 may be extended to crosswind straight out departure 658, straight out downwind departure 660, or angled downwind departure 662. Procedural trajectory prediction unit 134 may categorize an aircraft's trajectory as one of these several subsequent trajectories based at least in part on information on the aircraft's trajectory as it continues along or begins to depart standard traffic pattern 617.

In the example of crosswind straight out departure 658, an aircraft takes off from runway 610 beginning with upwind departure with crosswind turn 656, then continue on a straight track in line with the crosswind leg of standard traffic pattern 617. Procedural trajectory prediction unit 134 may categorize an aircraft's trajectory as crosswind straight out departure 658 if it meets the following example criteria, after going through upwind departure with crosswind turn 656:

D<x<=D+2 SM
−30 kt<=$\dot{x}$<=30 kt
0 SM<y<=1+1 SM for left pattern;
−1−1 SM<=y<0 SM for right pattern
if y<0, $\dot{y}$<=−50 kt; if y>=0, $\dot{y}$>=50 kt
TPAL<=z<=TPAU
−50 ft/min <=$\dot{z}$<=50 ft/min
if y<0, −90−15 deg<=$\alpha_f$<=−90+15 deg;
if y>=0, 90−15 deg<=$\alpha_f$<=90+15 deg
$\dot{\alpha}_f$=0 deg/sec In other examples, procedural trajectory prediction unit 134 may apply criteria for crosswind straight out departure 658 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of crosswind straight out departure 658, procedural trajectory prediction unit 134 may perform procedural trajectory prediction for that aircraft in accordance with a set of trajectory propagation rules specified for crosswind straight out departure 658. In some examples, one set of rules for trajectory propagation for crosswind straight out departure 658 may include propagating the aircraft's trajectory along a straight trajectory in line with or parallel to the crosswind leg of standard traffic pattern 617. An analogous predicted trajectory may be made for an aircraft departing along a base leg of standard traffic pattern 617.

Procedural trajectory prediction unit 134 may include data and/or algorithms related to various trajectories that may be performed either by approaching or departing aircraft, such as downwind leg turn 672, 360 degree turn 674, and base leg turn 676. Examples of qualifying criteria for categorizing an aircraft's flight into one of these trajectories, and trajectory propagation rules for these trajectories, are further described below. An aircraft's trajectory may follow a downwind leg turn 672 after a crosswind turn 656 and following the crosswind leg of standard traffic pattern 617, and prior to a straight out downwind departure 660, an angled downwind departure 662, or a base leg turn potentially preparatory to final approach and landing.

Procedural trajectory prediction unit 134 may categorize an aircraft's trajectory as a straight out downwind departure 660 if it meets the following example criteria, after going through downwind leg turn 672:

D−0.5 SM<=x<=D+2 SM
$\dot{x}$<0 kt
0.5−0.1 SM<=y<=1+1 SM for left pattern;
−1−1 SM<=y<=−0.5+0.1 SM for right pattern
if y<0, $\dot{y}$<=0 kt; if y>=0, $\dot{y}$>=0 kt
TPAL<=z<=TPAU
−50 ft/min<=$\dot{z}$<=50 ft/min
if y<0, −180 deg<=$\alpha_f$<=−90 deg;
if y>=0, 90 deg<=$\alpha_f$<180 deg
if y<0, $\dot{\alpha}_f$<0 deg/sec; if y>=0, $\dot{\alpha}_f$>0 deg/sec In other examples, procedural trajectory prediction unit 134 may apply criteria for straight out downwind departure 660 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of straight out downwind departure 660, procedural trajectory prediction unit 134 may perform procedural trajectory prediction for that aircraft in accordance with a set of trajectory propagation rules specified for straight out downwind departure 660. In some examples, one set of rules for trajectory propagation for straight out downwind departure 660 may include propagating the aircraft's trajectory along a straight trajectory in line with or parallel to the downwind leg of standard traffic pattern 617, and continuing in a straight line trajectory as it departs standard traffic pattern 617.

The example of angled downwind departure 662 is typically not a standard practice but is possible. In an angled downwind departure 662, an aircraft takes off from runway 610 beginning in an upwind departure, then engages crosswind turn 656 and follows the crosswind leg of standard traffic pattern 617, then follows angled downwind departure 662. Procedural trajectory prediction unit 134 may categorize an aircraft's trajectory as angled downwind departure 662 if, for example, the aircraft follows upwind departure with crosswind turn 656, then departs standard traffic pattern 617 at an angle intermediate between crosswind straight out departure 658 and downwind leg turn 672. Procedural trajectory prediction unit 134 may categorize an aircraft's trajectory as angled downwind departure 662 if it meets the following example criteria:

0<=x<=D
$\dot{x}$<=−30 kt
y>0.5 SM for left pattern; y<−0.5 SM for right pattern
if y<0, $\dot{y}$<=0 kt; if y>=0, $\dot{y}$>=0 kt
z>TPAL
$\dot{z}$>=0 ft/min;
if y<0, −180 deg<$\alpha_f$<=−135+45 deg;
if y>=0, 135−45 deg<=$\alpha_f$<180 deg
if y<0, $\dot{\alpha}_f$>0 deg/sec; if y>=0, $\dot{\alpha}_f$<0 deg/sec In other examples, procedural trajectory prediction unit 134 may apply criteria for angled downwind departure 662 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of angled downwind departure 662, procedural trajectory prediction unit 134 may perform procedural trajectory prediction for that aircraft in accordance with a set of trajectory propagation rules specified for angled downwind departure 662. In some examples, one set of rules for trajectory propagation for angled downwind departure 662 may include propagating the aircraft's trajectory along crosswind leg of standard traffic pattern 617, turning through angled downwind departure 662, and then straightening out in a straight line trajectory at an angle to downwind leg of standard traffic pattern 617, at the observed angle of departure, as the aircraft departs airspace 638.

In a controlled environment, sometime ATC will instruct an aircraft to make a left or right 360 degree turn to maintain separation in standard traffic pattern 617. In some examples, procedural trajectory prediction unit 134 may categorize an aircraft's trajectory as a 360 degree turn 674 if the aircraft turns out from standard traffic pattern 617 and executes a turn that exceeds 90 degrees, such as in accordance with the following criteria:

x<=D+1 SM
−200 kt<=$\dot{x}$<=200 kt
y>0.5 SM for left pattern; y<−0.5 SM for right pattern
if y<0, −15<=$\dot{y}$<=200 kt; if y>=0, −200<=$\dot{y}$<=15 kt
if x>=300 ft, TPAL ft<=z<=TPAU;
if x<300 ft, TPAL−400 ft<=z<=TPAU
−50 ft/min<=$\dot{z}$<=50 ft/min;
if y<0, −135+45 deg<$\alpha_f$<180 deg; if y>=0, −180 deg<=$\alpha_f$<135−45 deg
if y<0, $\dot{\alpha}_f$>0 deg/sec; if y>=0, $\dot{\alpha}_f$<0 deg/sec In other examples, procedural trajectory prediction unit 134 may apply criteria for 360 degree turn 674 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of 360 degree turn 674, procedural trajectory prediction unit 134 may perform procedural trajectory prediction for that aircraft in accordance with a set of trajectory propagation rules specified for 360 degree turn 674. In some examples, one set of rules for trajectory propagation for 360 degree turn 674 may include propagating the aircraft's trajectory at a constant track angle through the 360 degree turn 674, then straightening back into a straight line trajectory along the downwind leg of standard traffic pattern 617.

A base leg turn 676 is a transition in the standard traffic pattern 617 between the downwind leg and the final approach leg. Procedural trajectory prediction unit 134 may categorize an aircraft's trajectory as a base leg turn 676 if it meets the following example criteria:

x<=−0.5+0.3 SM
$\dot{x}$<=0 kt
0.5−0.3 SM<=y<=1+1 SM for left pattern;
−1−1<=y<=−0.5+0.3 SM for right pattern
if y<0, $\dot{y}$>0 kt; if y>=0, $\dot{y}$<0 kt
TPAL−400 ft<=z<=TPAU
$\dot{z}$<=50 ft/min;
if y<0, 90 deg<=$\alpha_f$<180 deg; if y>=0, −180 deg<$\alpha_f$<=−90 deg
if y<0, $\dot{\alpha}_f$>0 deg/sec; if y>=0, $\dot{\alpha}_f$<0 deg/sec In other examples, procedural trajectory prediction unit 134 may apply criteria for base leg turn 676 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of base leg turn 676, procedural trajectory prediction unit 134 may perform procedural trajectory prediction for that aircraft in accordance with a set of trajectory propagation rules specified for base leg turn 676. In some examples, one set of rules for trajectory propagation for base leg turn 676 may include propagating the aircraft's trajectory at a constant track angle along base leg turn 676 of standard traffic pattern 617, then straightening into a straight line trajectory along the base leg of standard traffic pattern 617.

A final turn 678 is a transition in the standard traffic pattern 617 between the base leg of standard traffic pattern 617 and the final approach and landing on runway 610. Final turn 678 may typically be at a shorter turn radius and take a short amount of time relative to other turns, since the airplane is typically at a lower speed as it prepares for landing. Final turn 678 may also typically be at a lower altitude than other turns. Procedural trajectory prediction unit 134 may categorize an aircraft's trajectory as a final turn 678 if it meets the following example criteria:

$Rp(ARP) <= TBD(3)$ NM
$IAS <= 150$ kt (optional)
$x <= -0.5 + 0.3$ SM
$15$ kt $<= \dot{x} <= -15$ kt
$0$ SM $< y <= 1 + 1$ SM for left pattern; $-1 - 1$ SM $<= y < 0$ SM for right pattern
if $y < 0$, $\dot{y} >= 30$ kt; if $y >= 0$, $\dot{y} <= -30$ kt
$z <= TPAU$
$\dot{z} <= TBD(50)$ ft/min;
if $y < 0$, $90 - 15$ deg $<= \alpha_f <= 90 + 15$ deg;
if $y >= 0$, $-90 - 15$ deg $<= \alpha_f <= -90 + 15$ deg
$\dot{\alpha}_f = 0$ deg/sec In other examples, procedural trajectory prediction unit 134 may apply criteria for final turn 678 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of final turn 678, procedural trajectory prediction unit 134 may perform procedural trajectory prediction for that aircraft in accordance with a set of trajectory propagation rules specified for final turn 678. In some examples, one set of rules for trajectory propagation for final turn 678 may include propagating the aircraft's trajectory at a constant track angle along final turn 678 of standard traffic pattern 617, then straightening into a straight line trajectory in line with the centerline XRwy25L of runway 610.

The final approach 680 is a descending flight path starting from the completion of final turn 678 and extending to the point of touchdown along runway 610. For an aircraft on final approach 680 along runway 610, the aircraft should already be separated from other aircraft and should typically not perform any maneuvers other than landing, taxiing, and full stop. In the alternative, an aircraft may perform a touch and go operation, i.e., briefly touch down but lift off again due to retaining excessive speed, in which case the aircraft may be observed in accordance with liftoff and upwind operations as described above. Procedural trajectory prediction unit 134 may categorize an aircraft's trajectory as a final approach 680 if it meets the following example criteria:

$-2$ SM $<= x <= M$
$\dot{x} >= 30$ kt
$-1500$ ft $<= y <= 1500$ ft
$-15$ kt $<= \dot{y} <= 15$ kt
$z <= TPAU$
$\dot{z} <= 50$ ft/min;
$-15$ deg $< \alpha_f < 15$ deg
$\dot{\alpha}_f = 0$ deg/sec
$IAS <= 150$ kt (optional)

In other examples, procedural trajectory prediction unit 134 may apply criteria for final approach 680 such as those above with any of a variety of other values, and/or omit one or more of the criteria listed above, and/or apply one or more additional criteria. If an aircraft meets all of the criteria applied by procedural trajectory prediction unit 134 for categorizing the aircraft in a trajectory of final approach 680, procedural trajectory prediction unit 134 may perform procedural trajectory prediction for that aircraft in accordance with a set of trajectory propagation rules specified for final approach 680. In some examples, one set of rules for trajectory propagation for final approach 680 may include propagating the aircraft's trajectory in a descending straight line track along runway 610 until landing.

While various traffic pattern maneuvers are described with respect to a particular airport 638 in the examples above, procedural trajectory prediction unit 134 may also apply analogous trajectory prediction criteria and trajectory propagation rules or patterns for a large number of other airports and/or airport configurations. Procedural trajectory prediction unit 134 may also apply different trajectory prediction criteria and trajectory propagation rules for different aircraft depending on the size, number of engines, or emitter category of the aircraft.

In some examples, procedural trajectory prediction unit 134 may also apply baro-altitude correction to determine the altitude of target aircraft. Since corrected baro-altitude information is useful to airport environment operation, and ADS-B reports carry uncorrected baro-altitude information, procedural trajectory prediction unit 134 may apply additional processing to apply altimeter settings to traffic altitudes of the target aircraft based on the ADS-B information received. When procedural trajectory prediction unit 134 is activated, the ownship may be in the vicinity of the airport and applying local altimeter setting to its avionics systems, using information received from ATIS or other services, and relaying the correct altimeter settings to ASSAP tracker 104. For an aircraft doesn't provide digital barometric corrections, it can optionally set a dedicated altimeter setting interface on the equipment control panel, or use a more flexible altitude criteria for a modified logic.

Figure 7:
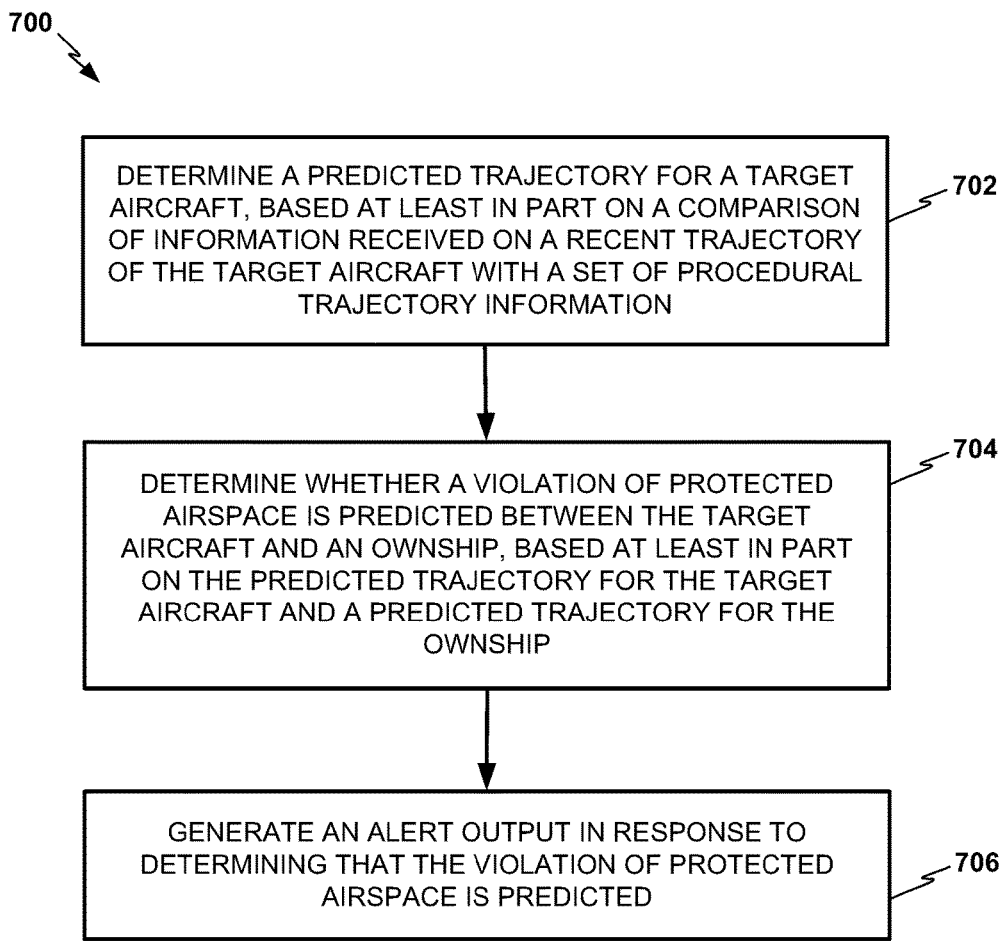
FIG. 7 shows a flowchart for an example method for generating air traffic alerts, in accordance with aspects of this disclosure, as may be performed by a TSAA system as in FIGS. 1 and 3, for example.

FIG. 7 shows a flowchart for an example method 700 for generating air traffic alerts, in accordance with illustrative aspects of this disclosure, as may be performed by TSAA system 106 as in FIGS. 1 and 3, for example. For TSAA system 106 performing method 700, TSAA system 106 (e.g., trajectory propagation unit 133 and/or procedural trajectory prediction unit 134) may determine a predicted trajectory for a target aircraft, based at least in part on a comparison of information received on a recent trajectory of the target aircraft with a set of procedural trajectory information (702). For TSAA system 106 performing method 700, TSAA system 106 (e.g., conflict search engine 140) may determine whether a violation of protected airspace is predicted between the target aircraft and an ownship, based at least in part on the predicted trajectory for the target aircraft and a predicted trajectory for the ownship(704). For TSAA system 106 performing method 700, TSAA system 106 (e.g., output node 141) may generate an alert output in response to determining that the violation of protected airspace is predicted (706).

As discussed above, various components of conflict detector unit 132 of TSAA system 106, including trajectory propagation unit 133, procedural trajectory prediction unit 134, conflict search engine 140, and conflict verification unit 144 may apply algorithms, data structures, digital logic systems, and/or other techniques, devices, or systems for performing the functions described herein. In some examples, TSAA system 106 may apply algorithms to predict discrete, constant turn-rate trajectories for all involved aircraft and alert based on predicted penetrations of protected airspace along those trajectories. As such, trajectory propagation unit 133, conflict search engine 140, and conflict verification unit 144 of TSAA system 106 may respectively apply algorithms for trajectory prediction for own-ship and intruder aircraft, protected airspace zones around intruder aircraft, and the alerting decision logic. Further illustrative description of trajectory propagation unit 133, conflict search engine 140, and conflict verification unit 144 of TSAA system 106 are provided as follows, including mathematical and software implementation of example algorithms. Such algorithms for implementing the various components of TSAA system 106 may be implemented in MATLAB, Python, R, Octave, Julia, or any other applicable language or toolset well-suited for rapid calculations on large data sets. The details presented below are given for one example algorithmic implementation for TSAA system 106, with the understanding that the details are not limiting to other example implementations.

An example algorithm for conflict search engine 140 may perform pair-wise evaluations to determine whether a conflict exists between the ownship and a particular target aircraft. Around each target aircraft, an algorithm may calculate two protected airspace zones denoted as the protected airspace zone (PAZ) and the collision airspace zone (CAZ), as shown in one example in FIG. 2. The size of the PAZ may be dependent on the closure rate between the target aircraft and the ownship. As a surrogate for the potential danger involved in a given encounter geometry, the size of the PAZ increases as closure rate increases, in this example. The CAZ remains fixed in size at a radius of 500 feet and a height of +/−200 feet, which are based on the position uncertainty of two rule-compliant ADS-B targets.

In an example algorithm for trajectory propagation unit 133, for the ownship as well as each target aircraft, discrete trajectories are predicted repeatedly at a nominal frequency (e.g. once per second). Trajectory propagation unit 133 may maintain some algorithms outside of procedural trajectory prediction unit 134 that may use a constant turn rate trajectory propagation, such that the propagated trajectories predict where a target aircraft would be if it were to continue its current maneuver at constant heading or constant track angle. A constant turn rate prediction defaults to a constant heading prediction in the absence of maneuvering.

Since the geometry between the two aircraft can change along the trajectories due to the constant turn rate prediction, the closure rate and with it the size of the PAZ between the two aircraft can also change. For example, as shown in FIG. 2, as the closure rate decreases along the trajectories, the size of the PAZ decreases. Based on the predicted positions of the aircraft and the sizes of the airspace buffer zones along the trajectory, the alerting logic determines whether or not to issue an alert for a given target. If the ownship is predicted to penetrate the PAZ, TSAA system 106 generates an alert output that TCAS computer 102 translates into an initial audio and/or video alert issued to the pilot, announcing the location and observed behavior of the target. A sample audio alert may be "Traffic, Twelve O'clock, Three Miles, High, Descending". If the situation continues unchanged or deteriorates and CAZ-penetration is predicted, TSAA system 106 generates another alert output with updated alert information for TCAS computer 102 to translate into an updated audio and/or video alert issued to the pilot, with updated position and behavior information. In the example geometry shown in FIG. 2, even though the PAZ decreases along the predicted trajectory of target aircraft 204 from PAZ 211 to PAZ 213, the ownship 202 is predicted to penetrate the PAZ 213 of target aircraft 204 in the future when ownship 202 and target aircraft 204 are at positions 232 and 234, respectively, e.g., 30 seconds into the future, resulting in TSAA system 106 generating an alert for TCAS computer 102 to issue to the flight crew.

Conflict detector unit 132 of TSAA system 106 may recurrently update threat data store 136 with new data regarding potential threats. TSAA system 106 may be implemented with algorithms that can be called in two different modes: and update mode and a detect mode. TSAA system 106 may be called to the update mode when new information is available from ASSAP tracker 104. In the update mode, TSAA system 106 may process incoming information from ASSAP tracker 104 and update threat data store 136 as applicable based on this new information. TSAA system 106 may operate in the update mode at least once per minimum update period, such as at least once per second for an update period of one hertz.

TSAA system 106 may operate in the detect mode to evaluate currently tracked targets for whether they pose a threat to the ownship. TSAA system 106 can be called in detect mode independently of whether new target information is available. TSAA system 106 uses the most recent data available in threat data store 136 when called in detect mode. Both the update and detect modes of TSAA system 106 are described herein from a functional and mathematical perspective. Throughout the description of the algorithms of TSAA system 106, parameters that define the internal behavior of the algorithm are introduced and defined as variables.

When TSAA system 106 is called in the update mode, TSAA system 106 updates threat data store 136 with the received state information from ASSAP tracker 104. Even though ASSAP tracker 104 maintains a track for all active aircraft, a separate threat data store 136 as part of TSAA system 106 may be useful for various reasons. First, threat data store 136 as part of TSAA system 106 allows for the maintenance of TSAA specific data locally within alerting algorithms of TSAA system 106. Second, threat data store 136 as part of TSAA system 106 allows for potentially pre-selecting which targets are maintained within TSAA system 106. For example, TSAA system 106 may for computational reasons only locally maintain targets that are within a predefined distance of the ownship.Data fields that may be maintained in threat data store 136 of TSAA system 106 may include: target aircraft ID; time of last information update; time of last information reception (e.g., time of reception of last ADS-B/ADS-R/TIS-B message); X, Y, and Z positions; X and Y velocities; aircraft heading; and estimated turn rate, estimated verticalrate, horizontal separation, vertical separation, and current closure rate as determined by TSAA system 106. When TSAA is called in the update mode, the reports from ASSAP tracker 104 containing data fields are used to fill the data fields for each of the active targets.

In addition to updating data for all existing targets in threat data store 136, TSAA system 106 may also add new targets not currently tracked or remove stale targets for which the data has become too old to be used for reliable conflict alerting. TSAA system 106 may use a maximum data age limit to determine when a target has become stale: if the difference between the time of last information update and the time of last ADS-B message reception is greater than that threshold, the target is discontinued. The threshold is denoted by the variable TarDiscont.

In one example algorithm, threat data store 136 may be implemented as a MATLAB structure that contains one object for each active target. Threat data store 136 may be analogously implemented in R, Python, Octave, Julia, or other applicable language or toolset.

When TSAA system 106 is called in the detect mode, TSAA system 106 may evaluate each target maintained in threat data store 136 to determine whether it poses a threat to the ownship. Adjusting the Conflict Search Freq variable in the example algorithm sets the frequency with which TSAA system 106 is called in detect mode. In detect mode, TSAA system 106 performs the individual functions of trajectory propagation unit 133, conflict search engine 140, and conflict verification unit 144 as shown in FIG. 3.

TCAS computer 102 and/or its components or features, including AS SAP tracker 104, TSAA system 106, procedural trajectory prediction unit 134, and/or other components or features thereof, may include one or more processors. The one or more processors may comprise any suitable arrangement of hardware, software, firmware, or any combination thereof, to perform the techniques attributed to TCAS computer 102 and/or any of its components or features described herein. For example, the one or more processors may include any one or more microprocessors, digital signal processors (DSPs), application specific integrated circuits (ASICs), field programmable gate arrays (FPGAs), or any other equivalent integrated or discrete logic circuitry, as well as any combinations of such components. TCAS computer 102 and/or its components or features (e.g., procedural trajectory information 138) may also include a memory which can include any volatile or non-volatile media, such as a RAM, ROM, non-volatile RAM (NVRAM), electrically erasable programmable ROM (EEPROM), flash memory, and the like. The memory may store computer readable instructions that, when executed by the one or more processors of TCAS computer 102 and/or its components or features cause the processors to implement functions and techniques attributed herein to TCAS computer 102 and/or its components or features.

Elements of TCAS computer 102 and/or its components or features as disclosed above may be implemented in any of a variety of additional types of solid state circuit elements, such as central processing units (CPUs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other type of component or one or more components capable of being configured in accordance with any of the examples disclosed herein. Elements of TCAS computer 102 and/or its components or features may be programmed with various forms of software. Elements of TCAS computer 102 and/or its components or features as in any of the examples herein may be implemented as a device, a system, an apparatus, and may embody or implement a method of combining air traffic surveillance data, including for implementing example method 700 as described with reference to FIG. 7.

An "aircraft" as described and claimed herein may be or include any fixed-wing or rotary-wing aircraft, airship (e.g., dirigible or blimp buoyed by helium or other lighter-than-air gas), suborbital space plane or reusable launch vehicle stage, spacecraft, or other type of flying device, and may be crewed or uncrewed (e.g., unmanned aerial vehicle (UAV) or flying robot). While some description uses the example of ADS-B radio surveillance data, other examples may use extensions or modifications to ADS-B, or other forms of ADS-B-like radio surveillance, or ADS-C or any kind of radio surveillance data, in any manner described in terms of the example of ADS-B data in the description herein.

Any of the systems of the examples of FIGS. 1-6 as described above, or any component thereof, may be implemented as a device, a system, an apparatus, and may embody or implement a method of implementing a method for generating air traffic alerts, including for implementing example method 700 as described with reference to FIG. 7. Various illustrative aspects of the disclosure are described above. These and other aspects are within the scope of the following claims.

What is claimed is:

1. A method comprising:
   determining a predicted trajectory for a target aircraft, based at least in part on a comparison of information received on a recent trajectory of the target aircraft with a set of procedural trajectory information, wherein the procedural trajectory information includes trajectories for joining a traffic pattern and trajectories for departing the traffic pattern;
   determining whether a violation of protected airspace is predicted between the target aircraft and an ownship, based at least in part on the predicted trajectory for the target aircraft and a predicted trajectory for the ownship; and
   generating an alert output in response to determining that the violation of protected airspace is predicted.

2. The method of claim 1, further comprising:
   qualifying the information received on the recent trajectory of the target aircraft with respect to the set of procedural trajectory information, prior to determining the predicted trajectory for the target aircraft; and
   determining the predicted trajectory for the target aircraft based also at least in part on the qualifying of the information received on the recent trajectory of the target aircraft with respect to the set of procedural trajectory information.

3. The method of claim 2, wherein qualifying the information received on the recent trajectory of the target aircraft with respect to the set of procedural trajectory information comprises:
   applying one or more criteria regarding at least one flight variable of the target aircraft, wherein the at least one flight variable is selected from among a position of the target aircraft, a vector velocity of the target aircraft, an altitude of the target aircraft, and a rate of change of altitude of the target aircraft; and
   selecting a predicted procedural trajectory for the target aircraft based at least in part on the at least one flight variable of the target aircraft meeting one or more conditions specific to the predicted procedural trajectory for the one or more criteria.

4. The method of claim 3, further comprising determining the predicted trajectory for a target aircraft by at least propagating a trajectory of the target aircraft from the recent trajectory in accordance with a selected predicted trajectory based on the one or more criteria.

5. The method of claim 1, further comprising receiving the information on the recent trajectory of the target aircraft, prior to determining the predicted trajectory for the target aircraft, wherein receiving the information on the recent trajectory of the target aircraft comprises receiving information from one or more automatic dependent surveillance-broadcast (ADS-B) reports from the target aircraft.

6. The method of claim 1, further comprising determining the predicted trajectory for the ownship, prior to determining whether a violation of protected airspace is predicted between the target aircraft and the ownship.

7. The method of claim 6, wherein determining the predicted trajectory for the ownship comprises determining the predicted trajectory based at least in part on a comparison of information on a recent trajectory of the ownship with the set of procedural trajectory information.

8. The method of claim 1, wherein the set of procedural trajectory information comprises at least one of data or executable instructions encoding at least a portion of an Airport/Facility Directory (A/FD).

9. The method of claim 1, wherein the set of procedural trajectory information comprises at least one of data or executable instructions encoding one or more of:
at least a portion of one or more airport diagrams;
at least a portion of a commercial navigation database or commercial navigation data store; and
an autonomous airport configuration recognition system.

10. The method of claim 1, further comprising generating an alert based at least in part on the alert output.

11. The method of claim 10, wherein generating the alert comprises generating at least one of:
an audio alert signal for output via an audio system; or
a video alert signal for output via a video display.

12. A system comprising:
a trajectory propagation unit configured to determine a predicted trajectory for a target aircraft, based at least in part on a comparison of information received on a recent trajectory of the target aircraft with a set of procedural trajectory information, wherein the procedural trajectory information includes trajectories for joining a traffic pattern and trajectories for departing the traffic pattern;
a conflict search engine configured to determine whether a violation of protected airspace is predicted between the target aircraft and an ownship, based at least in part on the predicted trajectory for the target aircraft and a predicted trajectory for the ownship; and
an output node configured to generate an alert output in response to determining that the violation of protected airspace is predicted.

13. The system of claim 12, wherein the trajectory propagation unit is further configured to:
qualify the information received on the recent trajectory of the target aircraft with respect to the set of procedural trajectory information, prior to determining the predicted trajectory for the target aircraft; and
determine the predicted trajectory for the target aircraft based also at least in part on the qualifying of the information received on the recent trajectory of the target aircraft with respect to the set of procedural trajectory information.

14. The system of claim 13, wherein the trajectory propagation unit is configured to qualify the information by at least:
applying one or more criteria regarding at least one flight variable of the target aircraft, wherein the at least one flight variable is selected from among a position of the target aircraft, a vector velocity of the target aircraft, an altitude of the target aircraft, and a rate of change of altitude of the target aircraft, and
selecting a predicted procedural trajectory for the target aircraft based at least in part on the at least one flight variable of the target aircraft meeting one or more conditions specific to the predicted procedural trajectory for the one or more criteria.

15. The system of claim 14, wherein the trajectory propagation unit is further configured to determine the predicted trajectory for the target aircraft by at least propagating a trajectory of the target aircraft from the recent trajectory in accordance with a selected predicted trajectory based on the one or more criteria.

16. The system of claim 12, wherein the set of procedural trajectory information comprises at least one of data or executable instructions encoding one or more of:
at least a portion of one or more airport diagrams;
at least a portion of a commercial navigation database or commercial navigation data store; and
an autonomous airport configuration recognition system.

17. A device comprising:
one or more memory devices; and
one or more processors communicatively coupled to the one or more memory devices and configured to:
determine a predicted trajectory for a target aircraft, based at least in part on a comparison of information received on a recent trajectory of the target aircraft with a set of procedural trajectory information, wherein the procedural trajectory information includes trajectories for joining a traffic pattern and trajectories for departing the traffic pattern;
determine whether a violation of protected airspace is predicted between the target aircraft and an ownship, based at least in part on the predicted trajectory for the target aircraft and a predicted trajectory for the ownship; and
generate an alert output in response to determining that the violation of protected airspace is predicted.

18. The device of claim 17, wherein the one or more processors are configured to:
qualify the information received on the recent trajectory of the target aircraft with respect to the set of procedural trajectory information, prior to determining the predicted trajectory for the target aircraft; and
determine the predicted trajectory for the target aircraft based also at least in part on the qualifying of the information received on the recent trajectory of the target aircraft with respect to the set of procedural trajectory information.

19. The device of claim 18, wherein the one or more processors are configured to qualify the information by at least:
applying one or more criteria regarding at least one flight variable of the target aircraft, wherein the at least one flight variable is selected from among a position of the target aircraft, a vector velocity of the target aircraft, an altitude of the target aircraft, and a rate of change of altitude of the target aircraft, and
selecting a predicted procedural trajectory for the target aircraft based at least in part on the at least one flight variable of the target aircraft meeting one or more conditions specific to the predicted procedural trajectory for the one or more criteria.

20. The device of claim 17, wherein the set of procedural trajectory information comprises at least one of data or executable instructions encoding one or more of:
at least a portion of one or more airport diagrams;
at least a portion of a commercial navigation database or commercial navigation data store; and
an autonomous airport configuration recognition system.

* * * * *